United States Patent
Goldin

(10) Patent No.: US 9,071,557 B2
(45) Date of Patent: Jun. 30, 2015

(54) SYSTEM AND METHOD FOR INTELLIGENT CACHING

(71) Applicant: Sybase 365, Inc., Reston, VA (US)

(72) Inventor: Vadim Goldin, Rockville, MD (US)

(73) Assignee: Sybase 356, Inc., Reston, VA (US)

(*) Notice: Subject to any disclaimer, the term of this patent is extended or adjusted under 35 U.S.C. 154(b) by 268 days.

(21) Appl. No.: 13/690,246

(22) Filed: Nov. 30, 2012

(65) Prior Publication Data

US 2013/0142117 A1 Jun. 6, 2013

Related U.S. Application Data

(60) Provisional application No. 61/566,140, filed on Dec. 2, 2011.

(51) Int. Cl.
| | |
|---|---|
| *H04L 12/58* | (2006.01) |
| *H04W 40/02* | (2009.01) |
| *H04L 12/747* | (2013.01) |
| *H04L 29/06* | (2006.01) |
| *H04L 29/08* | (2006.01) |

(52) U.S. Cl.
CPC .............. *H04L 45/742* (2013.01); *H04W 40/02* (2013.01); *H04L 65/1016* (2013.01); *H04L 67/2842* (2013.01)

(58) Field of Classification Search
CPC .............. H04L 45/742; H04L 65/1016; H04L 67/2842; H04W 40/02
See application file for complete search history.

(56) References Cited

U.S. PATENT DOCUMENTS

| | | | |
|---|---|---|---|
| 2003/0187992 A1 | 10/2003 | Steenfeldt et al. | |
| 2008/0318600 A1* | 12/2008 | Timmons et al. | 455/466 |
| 2009/0149186 A1 | 6/2009 | Kokoszka et al. | |
| 2010/0226488 A1* | 9/2010 | El Osta | 379/221.14 |
| 2011/0161983 A1* | 6/2011 | Brandow et al. | 719/313 |
| 2011/0237276 A1* | 9/2011 | Griset et al. | 455/456.1 |
| 2011/0289164 A1* | 11/2011 | Griset et al. | 709/206 |
| 2012/0042097 A1* | 2/2012 | Dudley | 709/242 |
| 2012/0063388 A1* | 3/2012 | Ruparelia et al. | 370/328 |

OTHER PUBLICATIONS

The International Search Report and the Written Opinion, PCT/US2012/067591, Jan. 26, 2013, 8 pages.

* cited by examiner

*Primary Examiner* — Paul H Masur
(74) *Attorney, Agent, or Firm* — Kenyon & Kenyon LLP

(57) ABSTRACT

As mobile subscribers increasingly employ their wireless devices to perform an ever expanding range of activities, it has become more and more important for all of the different entities in a wireless ecosystem (e.g., wireless carriers, intermediaries, service providers, etc.) to complete their processing activities in the most efficient, expeditious, flexible, etc. manner possible. An intelligent caching mechanism, through which for example various of the results of a preparatory step may be preserved for subsequent reuse, can inter alia incrementally reduce processing time, reduce system and network resource consumption, save money, etc.

14 Claims, 16 Drawing Sheets

SYSTEM AND METHOD FOR INTELLIGENT CACHING

This application claims the benefit of U.S. Provisional Application No. 61/566,140, filed Dec. 2, 2011, which is incorporated herein by reference in its entirety.

BACKGROUND

1. Field of the Invention

The present invention relates generally to telecommunications services. More particularly, the present invention relates to capabilities that can enhance substantially the value and usefulness of various communication paradigms including, inter alia, Short Message Service (SMS), Multimedia Message Service (MMS), Internet Protocol (IP) Multimedia Subsystem (IMS), Wireless Application Protocol (WAP), Electronic Mail (E-Mail), Instant Messaging (IM), streaming (audio, video, etc.) data, etc.

2. Background of the Invention

As the 'wireless revolution' continues to march forward (through various flavors of 2G, 3G, 4G, and beyond) the importance to a Mobile Subscriber (MS)—for example a user of a Wireless Device (WD) such as a mobile telephone, a portable computing device, a BlackBerry, a computer, etc. that is serviced in some way by a Wireless Carrier (WC)—of their WD grows substantially.

One consequence of the growing importance of WDs is the resulting ubiquitous nature of WDs—i.e., MSs carry them at almost all times and use them for an ever-increasing range of activities.

(Note: While portions of the discussion below will, for simplicity of exposition, refer to messaging generally and certain types of messaging—including inter alia SMS, MMS, etc.—specifically, it will be readily apparent to one of ordinary skill in the relevant art that application of aspects of the present invention to numerous other communication paradigms (including inter alia a Voice Over IP (VoIP) data stream, software application (e.g., game, etc.) data, a Session Initiation Protocol (SIP)-addressed artifact, a video data stream (e.g., a movie, a video conference call, etc.), a voice telephone call, an audio data stream (e.g., a song, etc.), signaling and other command-and-control data, etc.) is easily possible and indeed is fully within the scope of the present invention.)

Over the past many years various factors (including the ubiquitous nature of WDs) have driven a steady annual increase, year over year, in among other things the number of SMS, MMS, etc. messages that have been exchanged by and between WDs. That steady increase shows no sign of abating. For example, as reported by the industry group CTIA (see ctia.org on the World Wide Web) in the U.S. there were over 2.1 trillion SMS messages sent during 2010 (up from—approximately 363 billion SMS messages sent during 2007, approximately 158 billion SMS messages sent during 2006, and approximately 81 billion SMS messages sent during 2005) and there were over 56.6 billion MMS messages sent during 2010 (up from—approximately 34.0 billion MMS messages sent during 2009 and approximately 2.7 billion MMS messages sent during 2006).

As the volume of SMS, MMS, etc. messaging has increased in the past, and at present continues to increase, it has become more and more important for all of the different entities that process messages—e.g., WCs, intermediaries, enterprises, Content Providers (CPs), Service Providers (SPs), etc.—to deliver messages in the most efficient, expeditious, flexible, etc. manner possible.

A message may contain among other things a destination address—i.e., the address to where the message should be delivered—e.g., for a Peer-to-Peer (P2P) SMS message perhaps the Telephone Number (TN) of the recipient MS' WD; for an Application-to-Peer (A2P) SMS message perhaps a Short Code (SC) that is associated with a particular service (such as for example an advertising campaign); etc.

The delivery of a message may involve a number of operations including possibly inter alia (1) one or more preparatory steps (e.g., the resolution of the message's destination address—i.e., the authoritative identification of the entity (e.g., WC, landline carrier, etc.) that, at the moment that the message is being routed, services or that is otherwise associated with the address; the identification of the current physical location of the recipient; obtaining an identifying value (such as for example an International Mobile Subscriber Identity (IMSI) value); etc.) and (2) one or more conveyance steps (e.g., the actual delivery of possibly among other things the body or the content of the message, etc.).

Under certain circumstances various of the preparatory steps may become duplicative. For example, in the case where (1) $MS_1$ sends an SMS message to $MS_2$, (2) $MS_2$ replies to $MS_1$'s message (resulting in an SMS message going from $MS_2$ back to $MS_1$), and (3) $MS_1$ replies to $MS_2$'s reply message (resulting in an SMS message going from $MS_1$ back to $MS_2$) various of the preparatory steps associated with sending the second SMS message from $MS_1$ to $MS_2$ (including inter alia resolving a destination ($MS_2$'s) address, securing an IMSI value, etc.) may be duplicative and consequently may unnecessarily consume precious resources (including inter alia time, money, system resources, network resources, etc.).

SUMMARY OF THE INVENTION

To, among other things, address the effort duplication issues noted above, it would be desirable to intelligently cache selected of the results of various of the preparatory steps for subsequent reuse. Such intelligent caching would inter alia incrementally reduce message processing time, reduce system and network resource consumption (by for example reducing Signaling System Number 7 (SS7) Message Signal Unit (MSU) counts), save money, etc. Given the staggering message volumes that were summarized above, such intelligent caching would inter alia result in significant benefits.

The present invention provides a generalized infrastructure that offers, among other things, such intelligent caching capabilities and addresses various of the (not insubstantial) challenges that are associated with same in new and innovatory ways.

One embodiment of aspects of the present invention offers a server-based method for directing a quanta of data that includes at least (1) receiving a quanta of data at a gateway, the quanta of data comprising an originating address, a destination address, and a content, (2) performing a plurality of processing steps including at least (a) creating an Internal Message Object (IMO) from at least aspects of the quanta of data, (b) characterizing aspects of the quanta of data including at least by a type, (c) resolving the destination address, and (d) obviating the need to complete a preparatory step by retrieving at least an identifying value from a cache; and (3) utilizing the identifying value to complete a conveyance step through a gateway configured to select aspects of the IMO for dispatch via a delivery route.

An alternative embodiment of aspects of the present invention offers a processor-based system that is configured to direct a quanta of data and which includes at least (1) a gateway configured to receive a quanta of data, the quanta of data comprising an originating address, a destination address, and a content, (2) workflow modules configured to perform a plurality of processing steps including at least (a) create an Internal Message Object (IMO) from at least aspects of the quanta of data, (b) characterize aspects of the quanta of data including at least by a type, (c) resolve the destination address, and (d) obviate the need to complete a preparatory step by retrieving an identifying value from a cache; and (3) a gateway configured to utilize the identifying value to complete a conveyance step by selecting aspects of the IMO for dispatch via a delivery route.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the summary that was presented above and the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

Figure 1:
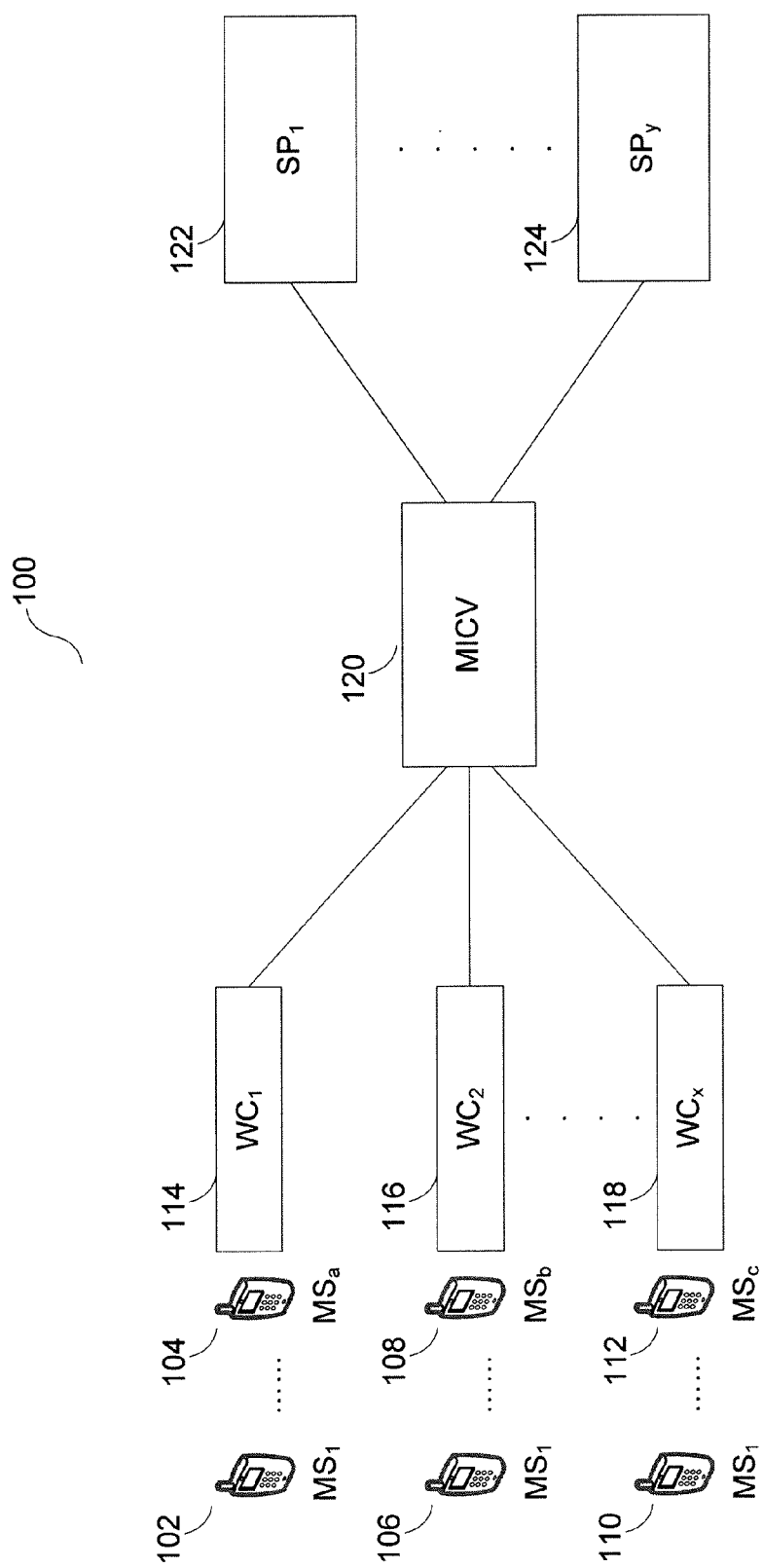
FIG. 1 is a diagrammatic presentation of an exemplary Messaging Inter-Carrier Vendor (MICV).

The present invention will now be described with reference to the accompanying drawings. In the drawings, generally, like reference numbers indicate identical or functionally similar elements. Additionally, generally, the left-most digit(s) of a reference number identifies the drawing in which the reference number first appears. For example, in FIG. 3 the reference numeral 120 would direct the reader to FIG. 1 for the first appearance of that reference numeral.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention.

Note that in this description references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

In the discussion below aspects of the present invention are described and illustrated as residing within a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a discussion of the concept of a MICV, a summary of various of the services/functions/etc. that may be performed by a MICV, and a discussion of various of the advantages that may arise from same. A MICV may, for example, be realized through any combination of, possibly inter alia, any one or more of (1) an element of a WC, an element of a landline carrier, or multiple such elements working together; (2) a Third-Party (3P) such as possibly inter alia a merchant, a CP (such as for example a news organization, an advertising agency, a brand, etc.), a financial institution, a SP (such as for example a provider of mobile services), etc.; (3) multiple 3P entities working together; (4) a service bureau; (5) a message service provider, and/or (6) other entities.

As illustrated in FIG. 1 and reference numeral 100 a MICV 120 is disposed between, possibly inter alia, multiple WCs ($WC_1$ 114, $WC_2$ 116,→$WC_x$ 118) on one side and multiple SPs ($SP_1$ 122 $SP_y$ 124) on the other side and is, in effect, a horizontally and vertically scalable 'hub' that may among other things 'bridge' all of the connected entities. A MICV 120 thus, as one simple example, may offer various routing, formatting, delivery, value-add, etc. capabilities that provide, possibly inter alia:

1) A WC $WC_1$ 114→$WC_x$ 118 (and, by extension, all of the MSs ($MS_1$ 102→$MS_a$ 104, $MS_1$ 106→$MS_b$ 108, $MS_1$ 110→$MS_c$ 112) that are serviced by the WC $WC_1$ 114→$WC_x$ 118) with ubiquitous access to a broad universe of SPs $SP_1$ 122→$SP_y$ 124, and 2) A SP $SP_1$ 122→$SP_y$ 124 with ubiquitous access to a broad universe of WCs $WC_1$ 114→$WC_x$ 118 (and, by extension, to all of the MSs ($MS_1$ 102→$MS_a$ 104, $MS_1$ 106→$MS_b$ 108, $MS_1$ 110→$MS_c$ 112) that are serviced by the WCs $WC_1$ 114→$WC_x$ 118).

Generally speaking a MICV may have varying degrees of visibility (e.g., access, etc.) to the (MS←→MS, MS←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that numerous other arrangements are equally applicable and indeed are fully within the scope of the present invention.

As just one example of an alternative arrangement, aspects of the present invention may be offered by a SP. A SP may, for example, be realized through any combination of, possibly inter alia, any one or more of (1) an element of a WC, an element of a landline carrier, an element of a MICV, or multiple such elements working together; (2) a 3P such as possibly inter alia a merchant, a CP (such as for example a news organization, an advertising agency, a brand, etc.), a financial institution, etc.; (3) multiple 3P entities working together; (4) a service bureau; (5) a message service provider; and/or (6) other entities.

Figure 2:
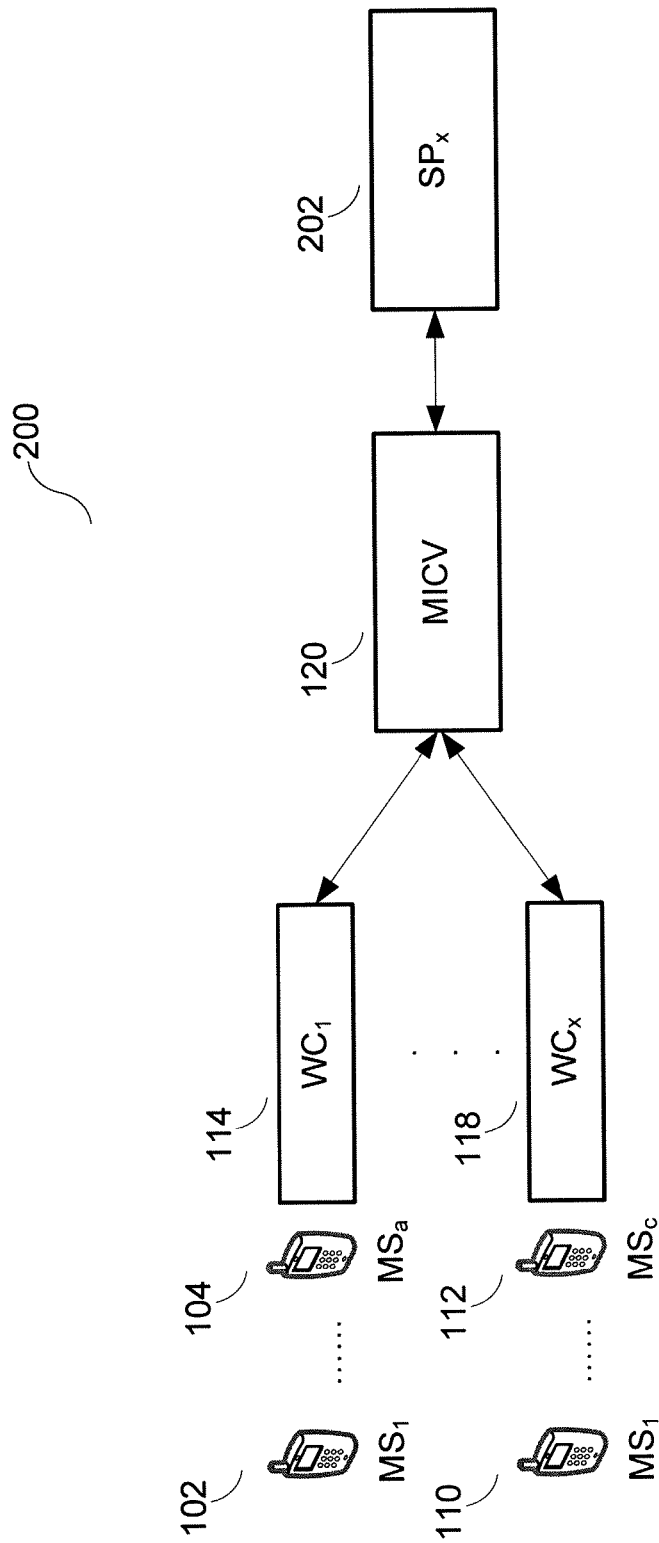
FIG. 2 illustrates one particular arrangement that is possible through aspects of the present invention.

FIG. 2 and reference numeral 200 depict one particular arrangement that may be possible under such an alternative arrangement. As the diagram portrays, the messaging traffic of numerous MSs ($MS_1$ 102→$MS_a$ 104 and $MS_1$ 110→$MS_c$ 112, including Mary) that are serviced by $WC_1$ 114→$WC_x$ 118 is exchanged with a MICV 120 and the MICV 120 is connected with $SP_x$ 202 (a SP that offers, possibly inter alia, aspects of the present invention).

While the discussion above referred to one specific alternative arrangement, it will be readily apparent to one of ordinary skill in the relevant art that numerous other alternative arrangements (including inter alia the use of multiple SPs; the sharing, blending, etc. of functionality between a MICV and one or more SPs; etc.) are equally applicable and indeed are fully within the scope of the present invention.

For variety, completeness etc. of exposition, portions of the discussion below will include a MICV and a SP. As noted above, it will be readily apparent to one of ordinary skill in the relevant art that numerous other arrangements are easily possible (e.g., any combination of one or more of inter alia a single MICV, multiple MICVs, a single SP, multiple SPs, etc.).

In the discussion below reference is made to messages that may be sent, for example, between a MS and a SP. As set forth below, a given 'message' sent between a MS and a SP may actually comprise a series of steps in which the message is received, forwarded and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

Figure 3:
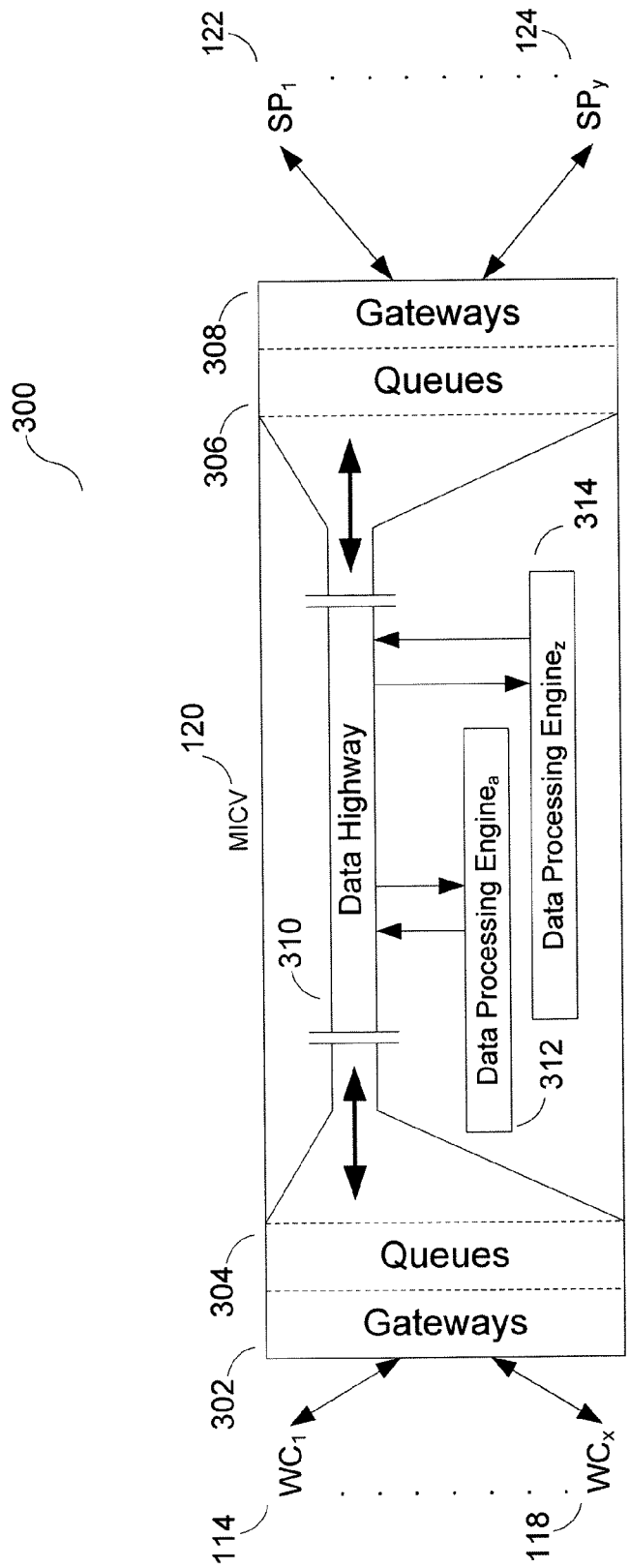
FIG. 3 illustrates various implementation aspects of an exemplary MICV.

For purposes of illustration, FIG. 3 and reference numeral 300 depict one possible logical implementation of aspects of a MICV 120 under one particular arrangement (interposed between WCs $WC_1$ 114→$WC_x$ 118 on one side and $SP_1$ 122→$SP_y$ 124 on the other side). The figure depicts among other things Gateways (302 and 308 that for example provide information/data receipt and dispatch capabilities—from/to WCs, SPs, and possibly other entities—across possibly inter alia different application-level communication protocols), Queues (304 and 306 that for example provide interim storage and buffering capabilities), a Data Highway (DH 310, that for example provides interconnection capabilities), and DPEs 312→314.

Figure 4:
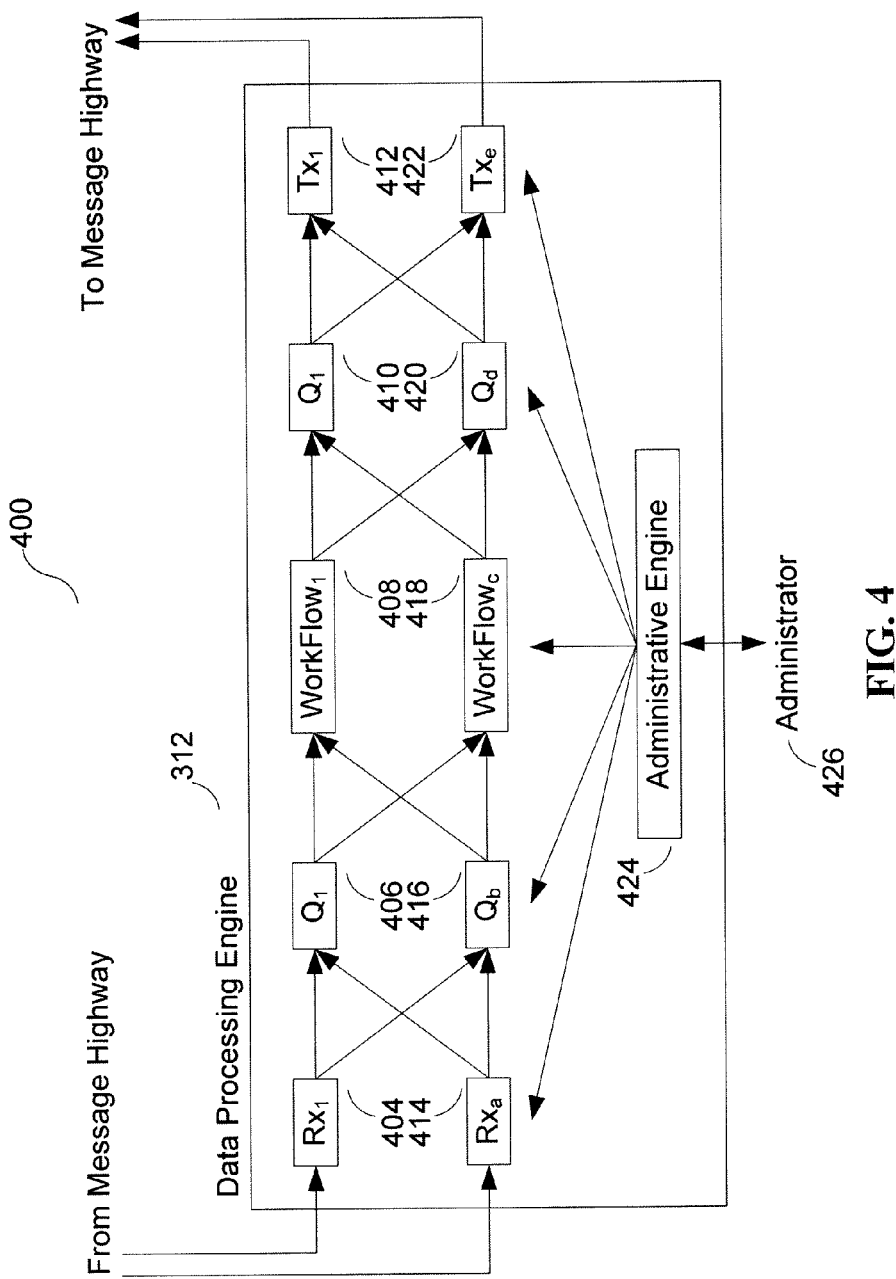
FIG. 4 illustrates various implementation aspects of an exemplary MICV Data Processing Engine (DPE).

FIG. 4 and reference numeral 400 depict a possible logical implementation of aspects of a DPE 312. A DPE may contain several key components—Receivers ($Rx_1$ 404→$Rx_a$ 414 in the diagram), Queues ($Q_1$ 406→$Q_b$ 416 and $Q_1$ 410→$Q_d$ 420 in the diagram), WorkFlows ($WorkFlow_1$ 408→$WorkFlow_c$ 418 in the diagram), Transmitters ($Tx_1$ 412→$Tx_e$ 422 in the diagram), and an Administrator 426. It will be readily apparent to one of ordinary skill in the relevant art that numerous other components, component arrangements, etc. are possible within a DPE.

A dynamically updateable set of one or more Receivers ($Rx_1$ 404→$Rx_a$ 414 in the diagram) 'get' messages from a MICV DH and deposit them on an intermediate or temporary Queue ($Q_1$ 406→$Q_b$ 416 in the diagram) for subsequent processing.

A dynamically updateable set of one or more Queues ($Q_1$ 406→$Q_b$ 416 and $Q_1$ 410→$Q_d$ 420 in the diagram) operate as intermediate or temporary buffers for incoming and outgoing messages.

A dynamically updateable set of one or more WorkFlows ($WorkFlow_1$ 408→$WorkFlow_c$ 418 in the diagram) remove incoming messages from an intermediate or temporary Queue ($Q_1$ 406→$Q_b$ 416 in the diagram), perform all of the required operations on the messages, and deposit the processed messages on an intermediate or temporary Queue ($Q_1$ 410→$Q_d$ 420 in the diagram). The WorkFlow component will be described more fully below.

A dynamically updateable set of one or more Transmitters ($Tx_1$ 412→$Tx_e$ 422 in the diagram) remove processed messages from an intermediate or temporary Queue ($Q_1$ 410→$Q_d$ 420 in the diagram) and 'put' the messages on a MICV DH.

An Administrative Engine 424 provides a linkage to all of the different components of a DPE so that a DPE, along with all of the different components of a DPE, may be fully and completely administered or managed 426.

Aspects of a MICV may 'plug into' different layers/levels/etc. of legacy, current, and/or future technology of inter alia WCs, SPs, etc. and among other things may for example facilitate interoperation between such technologies.

For example, from a traditional messaging context an entity (such as for example a WC, a 3P such as a CP, etc.) may direct their Short Message Service Center (SMSC) complexes, their Multimedia Message Service Center (MMSC) complexes, etc. to connect to a single, simple, consolidated, etc. interface mechanism that is exposed by a MICV and subsequently seamlessly exchange message traffic.

For example, from a traditional wireless context an entity (such as for a WC, etc.) may direct aspects of their infrastructure to connect to a single, simple, consolidated, etc. interface mechanism that is exposed by a MICV and subsequently seamlessly exchange SS7-based and/or IP-based signaling data, General Packet Radio Service (GPRS) Roaming Exchange (GRX) data, location and presence data, etc.

Central to the operation of a MICV is the unit of information within a MICV that is received, manipulated or otherwise operated on, dispatched, etc. Unlike prior environments that might operate just on, and thus potentially be limited just to, an SMS message or a MMS message, the unit of information within a MICV is a more general quanta of data. Accordingly a MICV is natively capable of operating on inter alia an SMS message, a MMS message, an IMS message, an E-Mail message, a VoIP data stream, a video data stream (e.g., a movie, a video conference call, etc.), a voice telephone call, signaling and other command-and-control data, an audio data stream (e.g., a song, etc.), IM data, games and other software applications, pictures and other static images, data from software applications such as games, etc.

Figure 5:
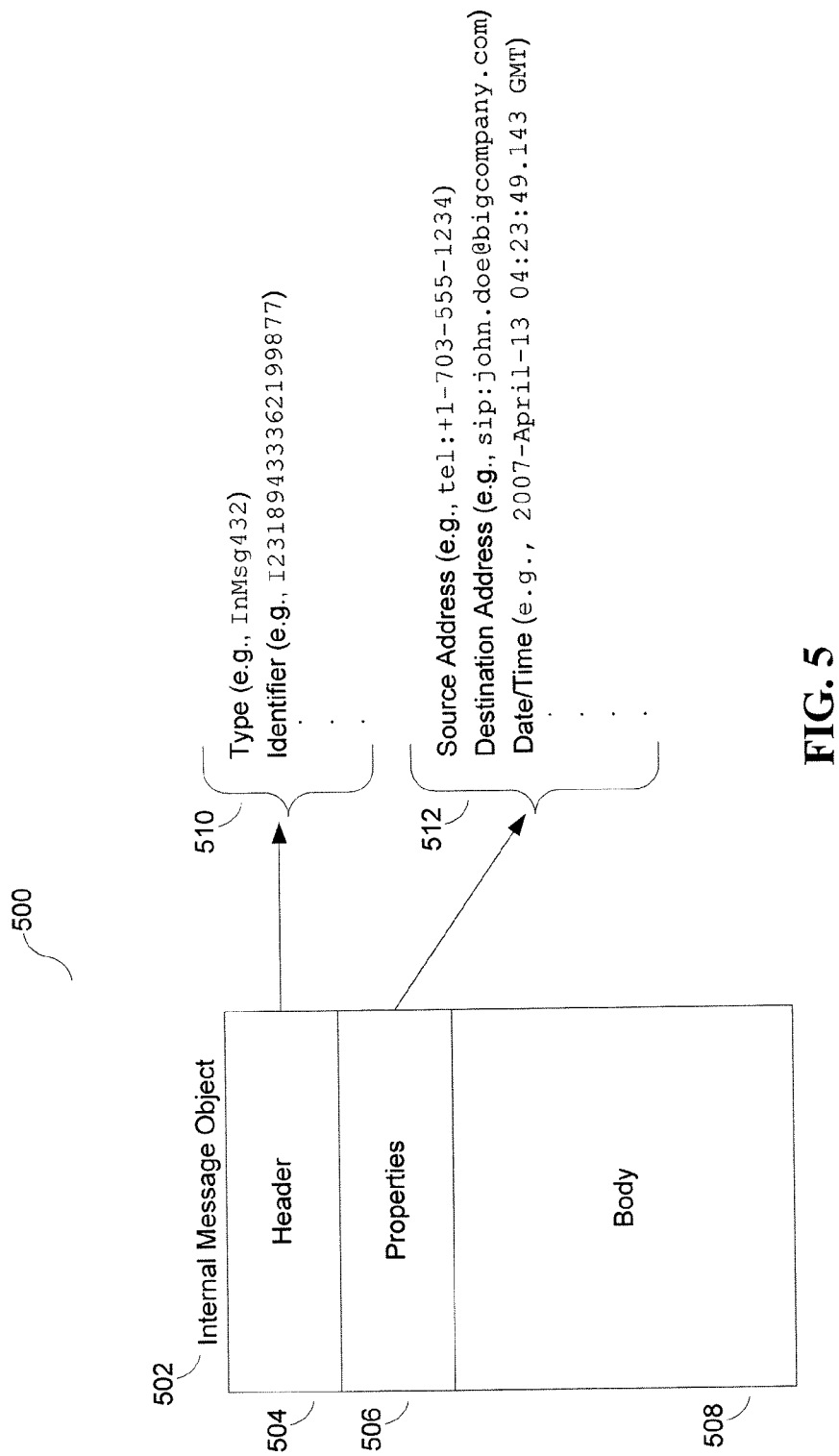
FIG. 5 illustrates aspects of an exemplary Internal Message Object (IMO).
Figure 6:
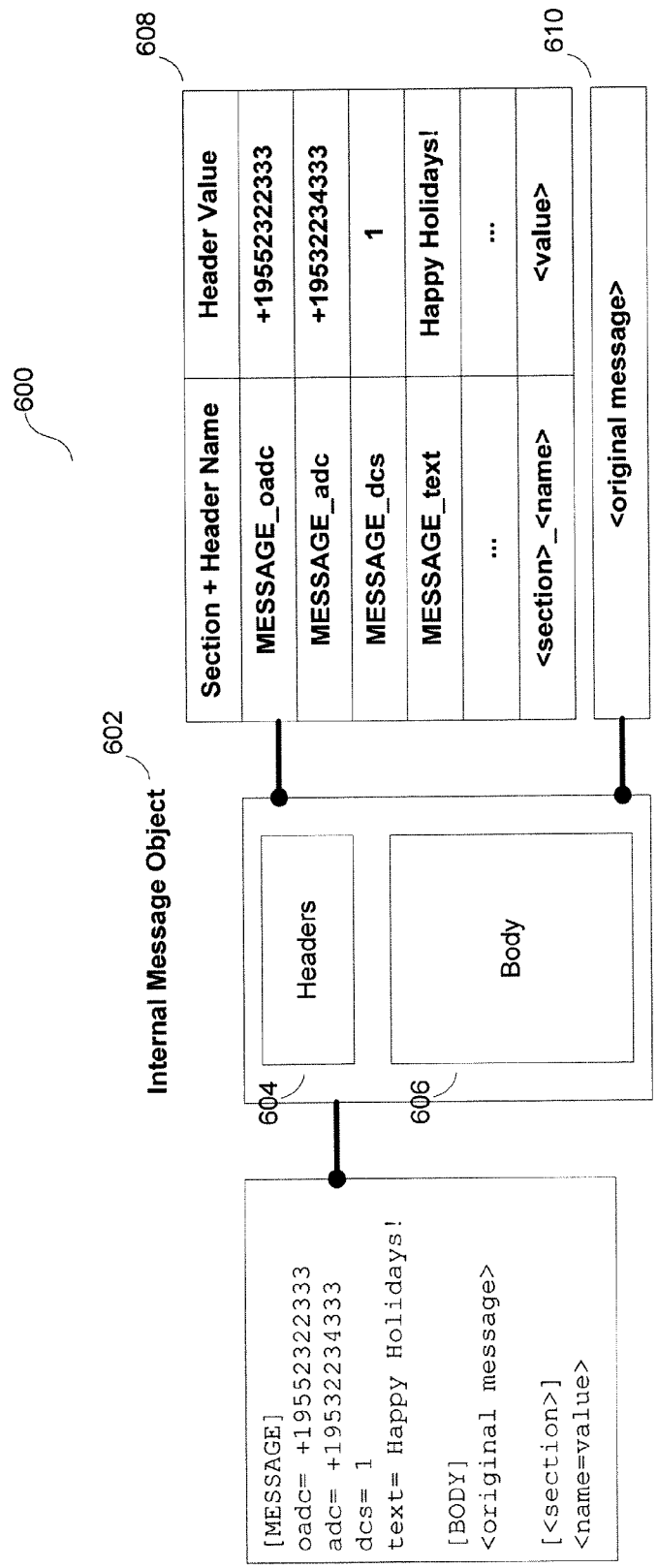
FIG. 6 illustrates aspects of an exemplary IMO.

Within a MICV a flexible, extensible, and dynamically configurable IMO (see for example FIG. 5 and reference numeral 500 and FIG. 6 and reference numeral 600) may be employed as an internal representation of aspects of a received quanta of data. An IMO (502 and 602) may logically contain possibly inter alia one or more headers (504 and 604), properties (506), a body (508 and 606), etc. within which for example aspects of a received quanta of data may be preserved (510→512 and 608→610). An IMO may physically be realized through any combination of possibly inter alia proprietary data structures, Java Message Service (JMS) messages or objects, flat files, database entries, in-memory constructs, etc.

Figure 7:
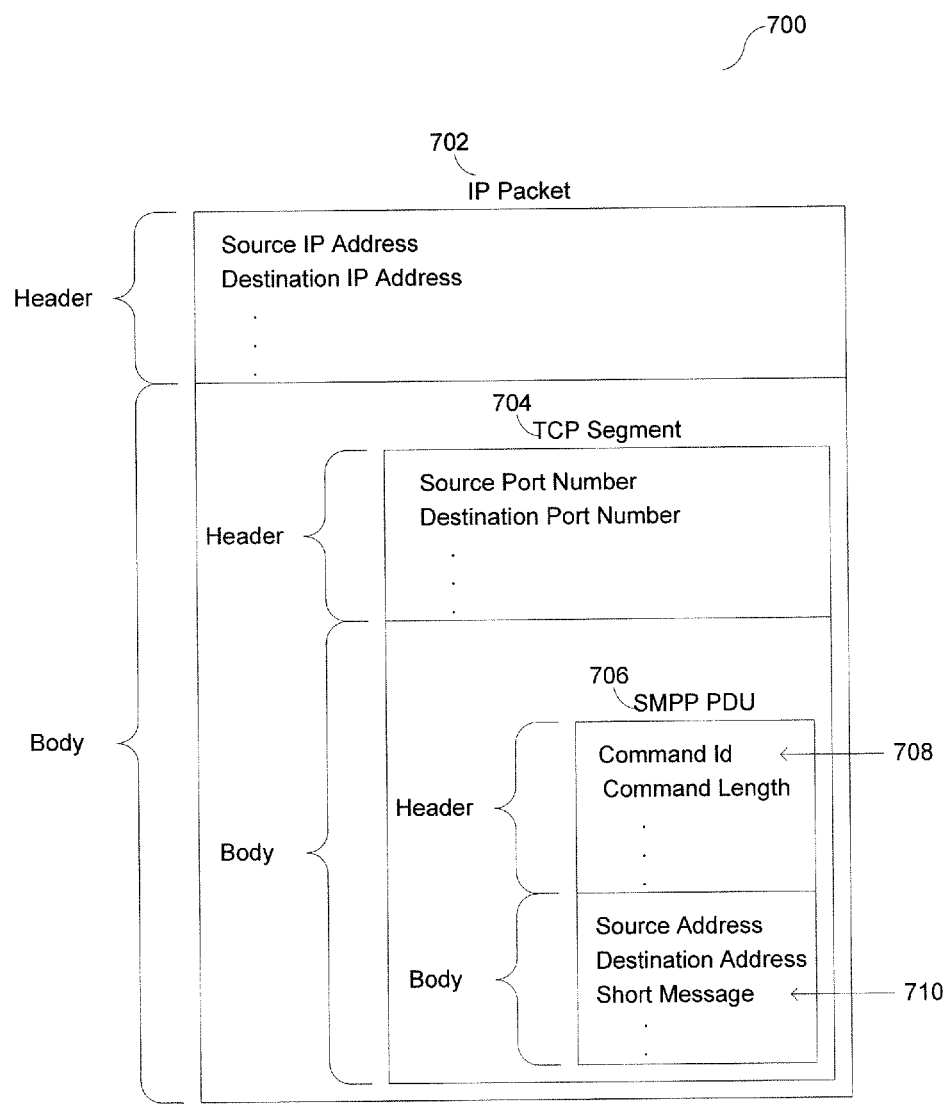
FIG. 7 illustrates aspects of an exemplary incoming SMS message received via an IP-based protocol.

For purposes of illustration, within an SMS context a MICV may support the receipt and dispatch of information through possibly inter alia Short Message Peer-to-Peer (SMPP) via Transmission Control Protocol (TCP)/IP and Mobile Application Part (MAP) via SS7. Under such a context:

1) FIG. 7 and reference numeral 700 depict an exemplary incoming SMS message received via for example SMPP with for example the data elements associated with the SMS message 708→710 encapsulated within a SMPP Protocol Data Unit (PDU) 706 encapsulated within a TCP Segment 704 encapsulated within an IP Packet 702.

Figure 8:
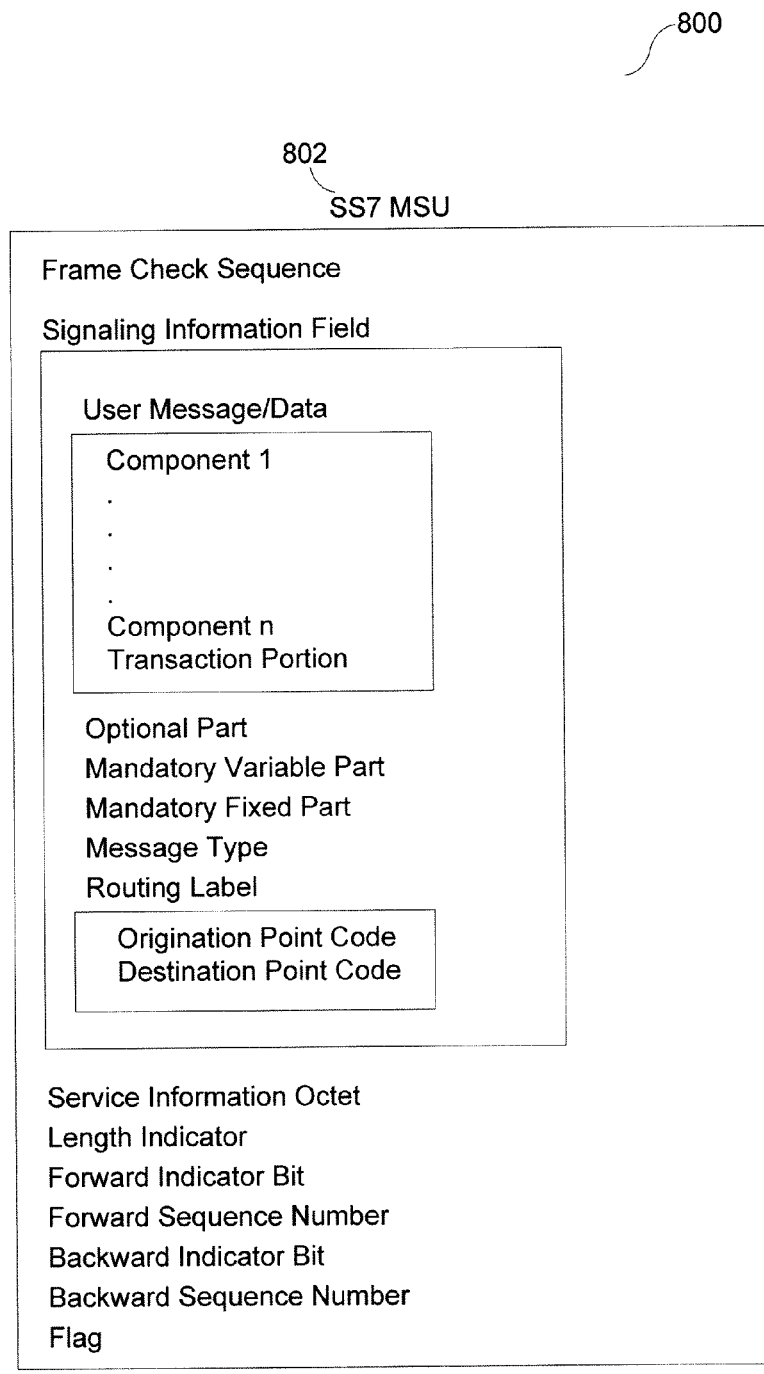
FIG. 8 illustrates aspects of an exemplary incoming SMS message received via SS7.

2) FIG. 8 and reference numeral 800 depict an exemplary incoming SMS message received via for example MAP with for example the data elements associated with the SMS message encapsulated within a MSU 802.

Figure 9:
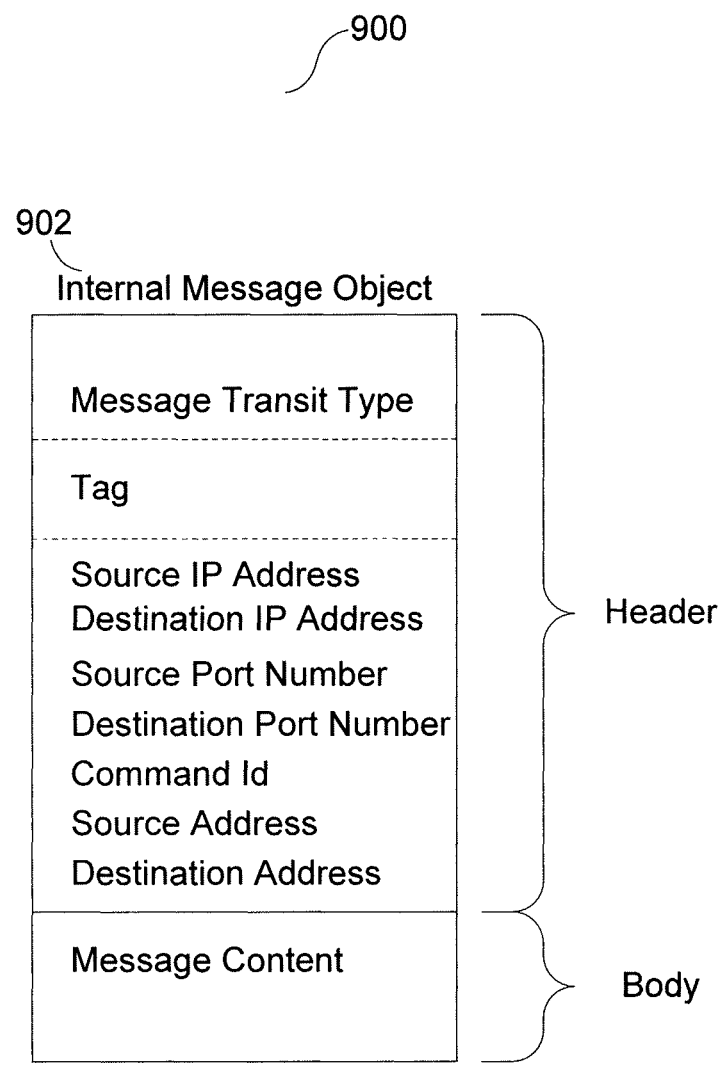
FIG. 9 illustrates aspects of a hypothetical IMO that is possible in connection with an SMS message received via an IP-based protocol.
Figure 10:
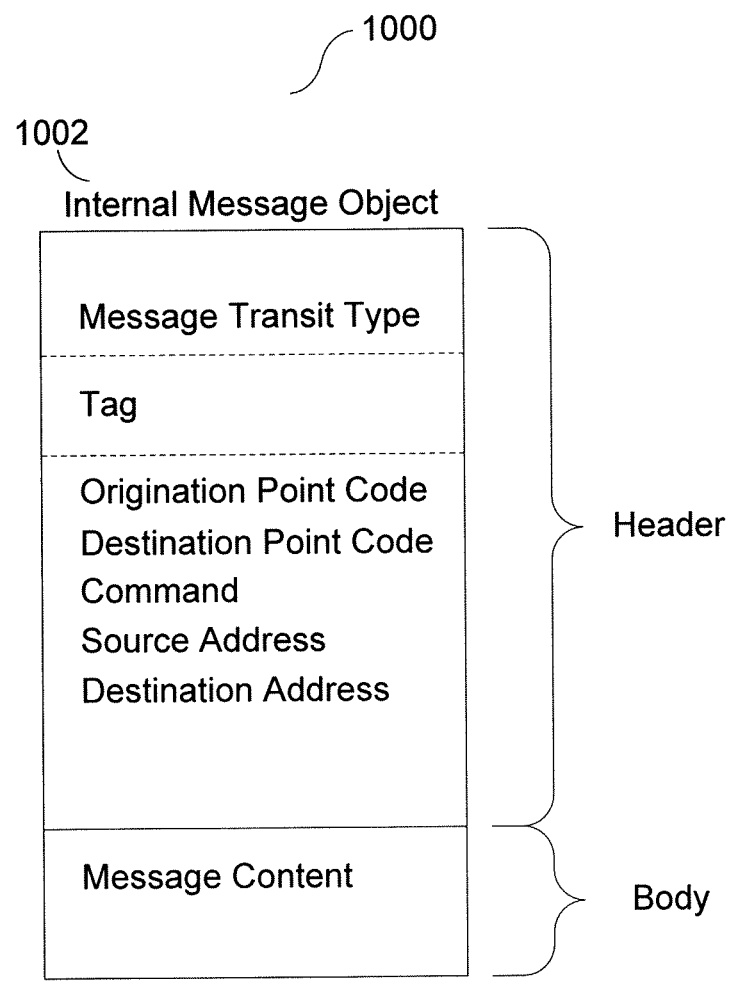
FIG. 10 illustrates aspects of a hypothetical IMO that is possible in connection with an SMS message received via SS7.

3) FIG. 9 and reference numeral 900 depict a hypothetical IMO 902 that is possible in support of an SMS message received via for example SMPP, and 4) FIG. 10 and reference numeral 1000 depict a hypothetical IMO 1002 that is possible in support of an SMS message received via for example MAP.

The artifacts that are depicted by FIGS. 7→10 are illustrative only and it will be readily apparent to one of ordinary skill in the art that among other things numerous alternative IMO arrangements—in connection with for example different contexts (such as inter alia MMS, VoIP, a voice call, signaling data, command-and-control data, software application data, etc.), different communication protocols, etc.—are easily possible. For example, information on the identity, location, capabilities, etc. of an originating party and/or a destination party may be captured, preserved, etc. in any number of ways.

As noted above, a WorkFlow component (see for example WorkFlow$_1$ 408→WorkFlow$_c$ 418 in FIG. 4) may perform a range of processing operations on inter alia a message.

Among other things a WorkFlow component may leverage a comprehensive, flexible, scalable, etc. address resolution facility to support, possibly inter alia, its routing operations. Such a facility may provide authoritative answers to inquiries like "At this moment in time what carrier services the TN 1-703-555-1212 ?", "What entity services the SIP address sip: john.doe@bigcompany.com?", etc. Among other things such a facility may address (1) the complexities that are associated with all of the different TN numbering plans, schemes, etc. that exist around the world; (2) the complexities that arise with worldwide Mobile Number Portability (MNP) regimes; etc.

Figure 11:
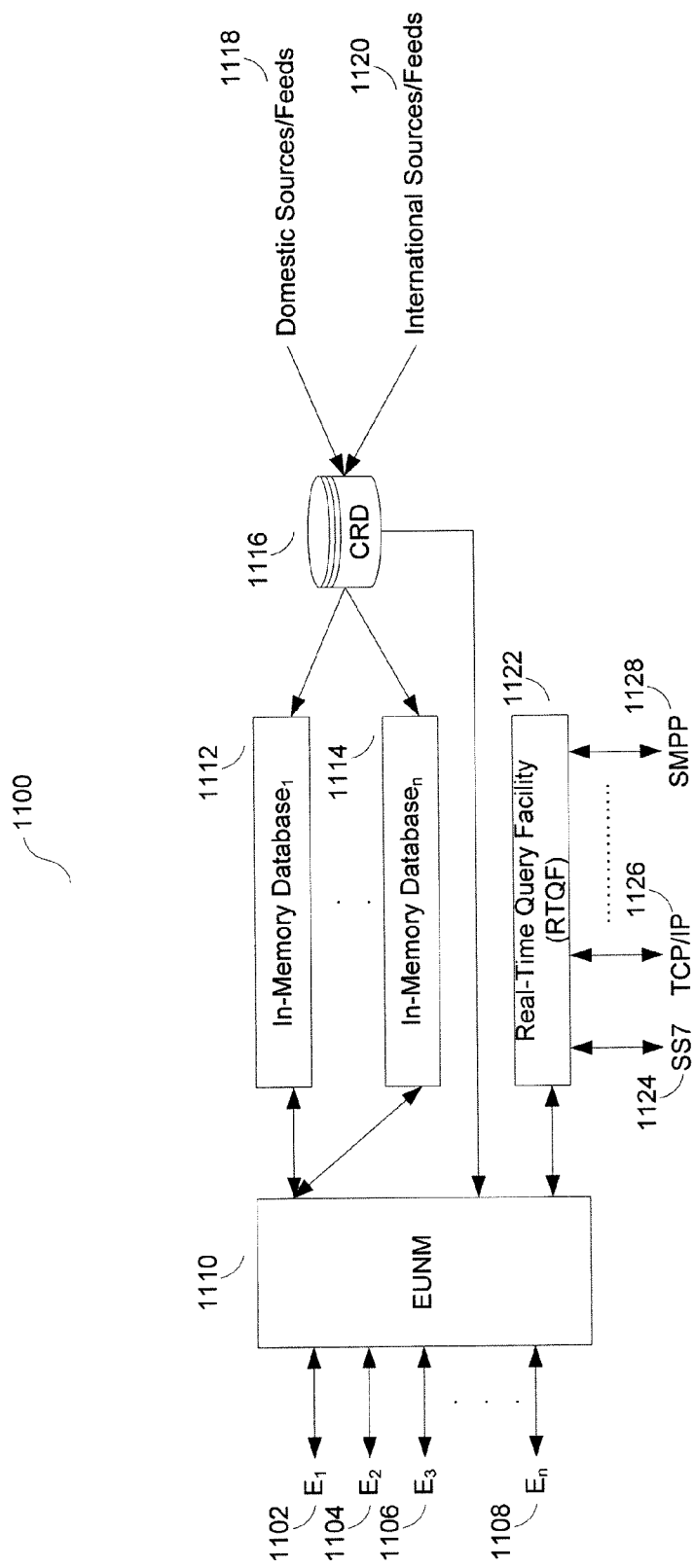
FIG. 11 illustrates aspects of an exemplary address resolution facility.

A depiction of an illustrative address resolution facility is presented in FIG. 11 and reference numeral 1100. Such a facility may consist of, possibly inter alia:

A) An Electronic Numbering (ENUM) façade 1110 through which possibly inter alia various elements of a Work-Flow component (E$_1$ 1102, E$_2$ 1104, E$_3$ 1106,→E$_n$ 1108 in FIG. 11) may connect, submit routing inquiries, receive routing responses, etc.

B) A dynamically updateable set of one or more In-Memory Databases (In-Memory Database$_1$ 1112→In-Memory Database$_n$ 1114 in the diagram) that optionally house or host selected data (including, possibly inter alia, data from a Composite Routing Database (CRD) 1116) to provide, as one example, optimal performance.

C) A Real-Time Query Facility (RTQF) 1122 through which inquiries may be dispatched real-time to authoritative bodies (such as, for example, TN assignment administrators) around the world. A RTQF 1122 may support multiple communication channels, paradigms, protocols, etc. (such as, possibly inter alia, SS7 1124, TCP/IP 1126, User Datagram Protocol (UDP)/IP, SMPP 1128, etc.).

D) A CRD 1116 containing comprehensive routing information for, possibly inter alia, TNs within all of the different TN numbering plans, schemes, etc. that exist around the world. A CRD 1116 may receive updates (e.g., dynamically, on a scheduled basis, etc.) from any number of sources or feeds including, possibly inter alia, domestic 1118 (such as, for example, from a Local Exchange Routing Guide (LERG), from one or more Number Portability Administration Centers (NPACs), etc.) and international 1120 (such as, for example, from Hong Kong, from the United Kingdom, etc.).

An address resolution facility as described above may support a wide range of address types including among others a TN (such as 703-555-1234), a SC (such as 46625), a SIP Uniform Resource Identifier (URI, such as sip: mark@mydomain.com), a Tel URI (such as tel:+19257652333), a Uniform Resource Locator (URL), etc.

Figure 12:
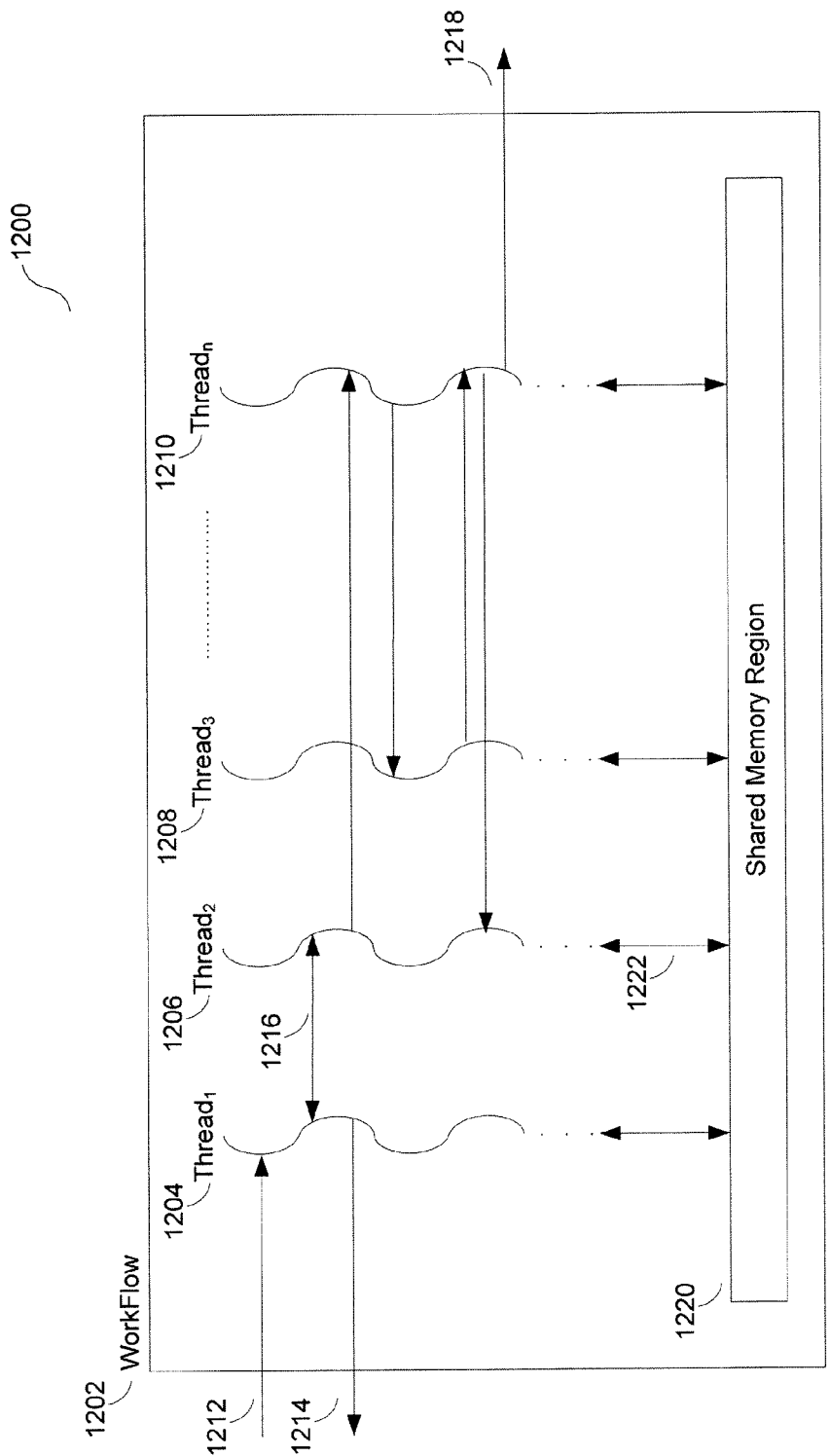
FIG. 12 depicts aspects of a hypothetical WorkFlow implementation that is possible under aspects of the present invention.

A WorkFlow component may be implemented or realized in any number of ways. For example, FIG. 12 and reference numeral 1200 depict aspects of a hypothetical implementation of a WorkFlow environment 1202 wherein possibly inter alia:

1) A dynamically adjustable number of threads (Thread$_1$ 1204, Thread$_2$ 1206, Thread$_3$ 1208,→Thread$_n$ 1210) may be inter alia created, started, allowed to operate or execute, quiesced, stopped, destroyed, etc. under control of for example the WorkFlow environment 1202. Among other things one or more threads may for example realize aspects of one or more elements of a MICV (such as for example routing operations, protocol conversion operations, message transmission operations, etc.) and/or a single thread may for example realize aspects of one or more elements of a MICV (such as for example routing operations, protocol conversion operations, message transmission operations, etc.).

2) Different elements of a MICV (such as for example routing operations, protocol conversion operations, message transmission operations, etc.) may communicate, interact, etc. with various of the threads (Thread$_1$ 1204→Thread$_n$ 1210) (see for example 1212, 1214, and 1218).

3) Various of the threads (Thread$_1$ 1204→Thread$_n$ 1210) may among themselves communicate, interact, etc. (see for example 1216).

4) Various of the threads (Thread$_1$ 1204→Thread$_n$ 1210) may communicate, interact, etc. with inter alia a Shared Memory Region (1220) (see for example 1222).

Figure 13A:
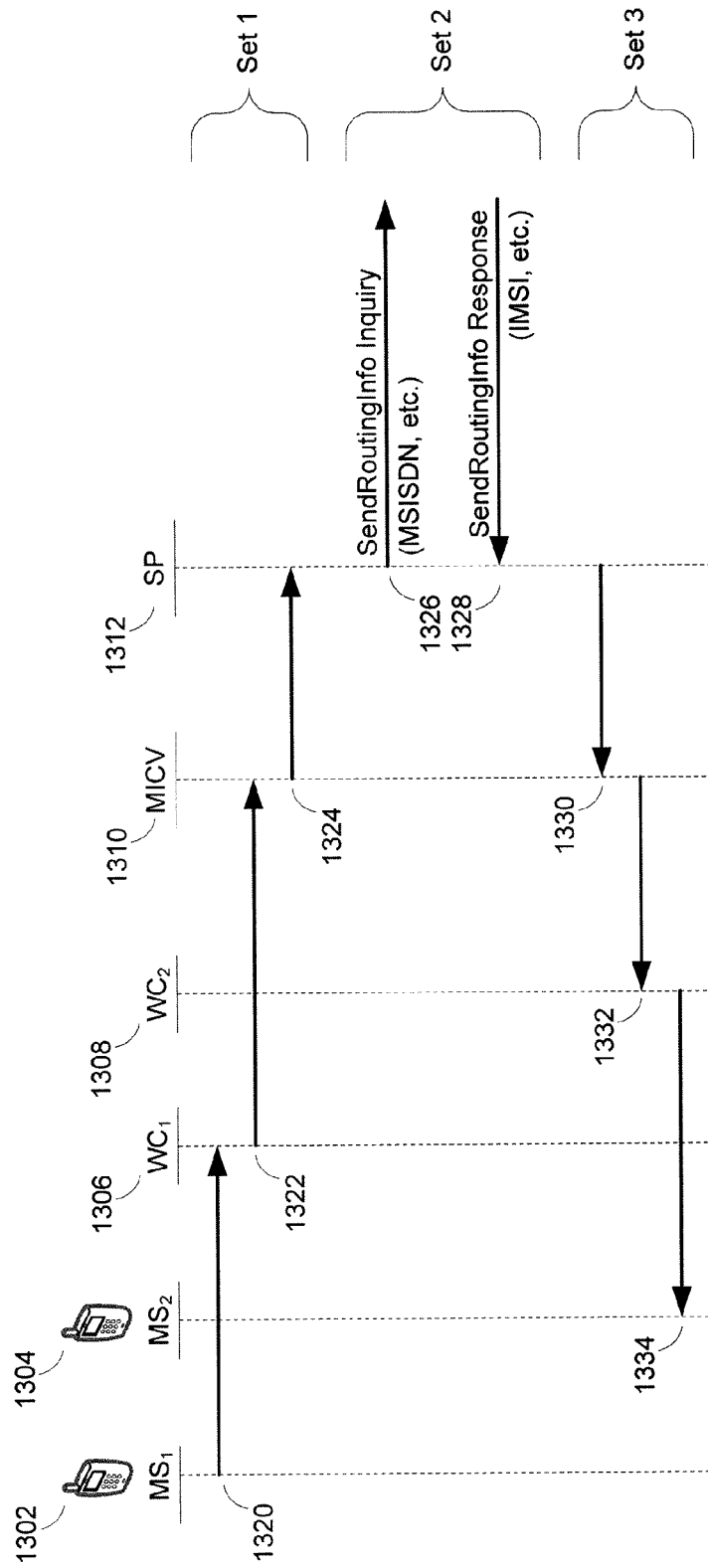
FIGS. 13a, 13b, and 13c illustrate various of the exchanges that are possible under aspects of the present invention.
Figure 13B:
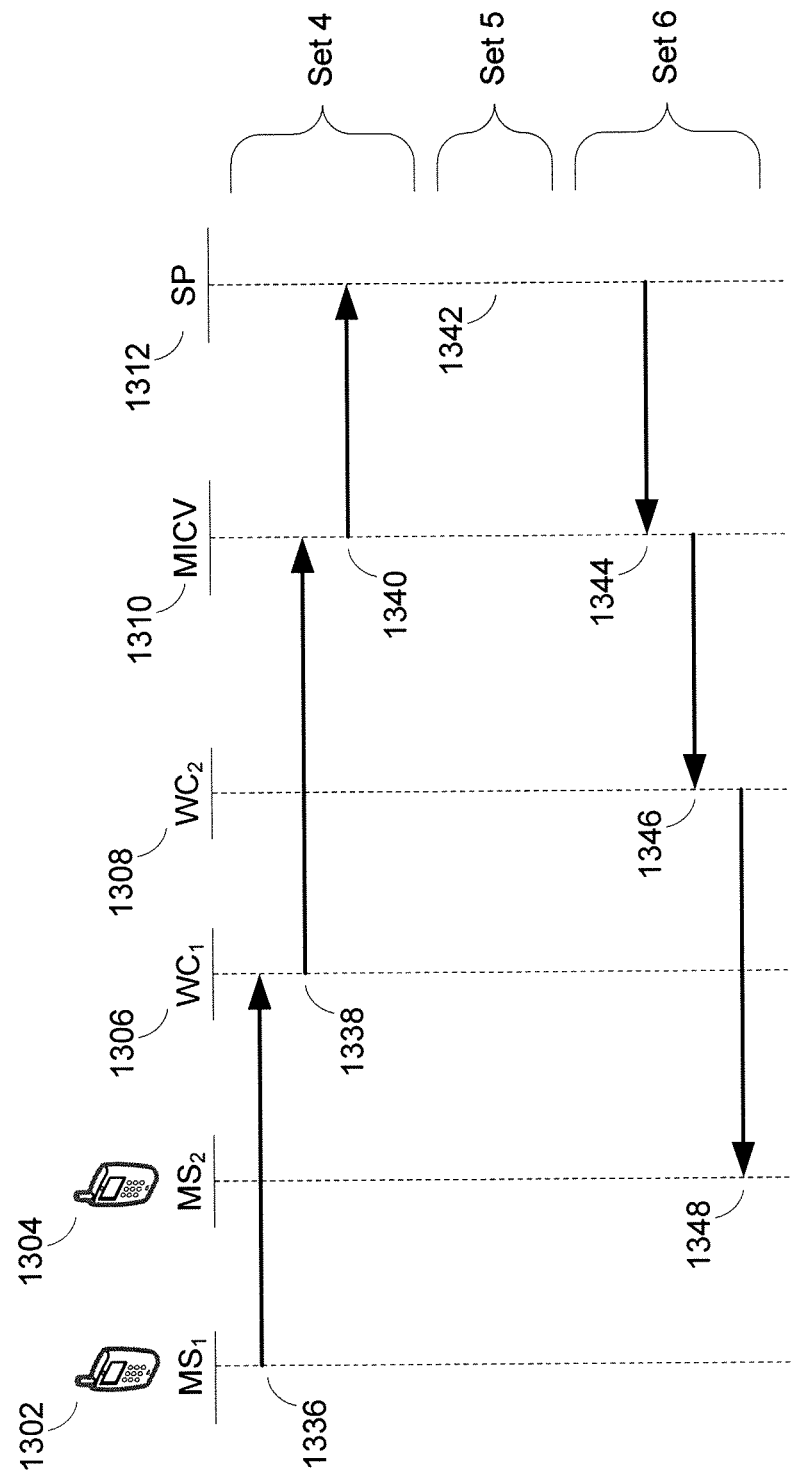
Figure 13C:
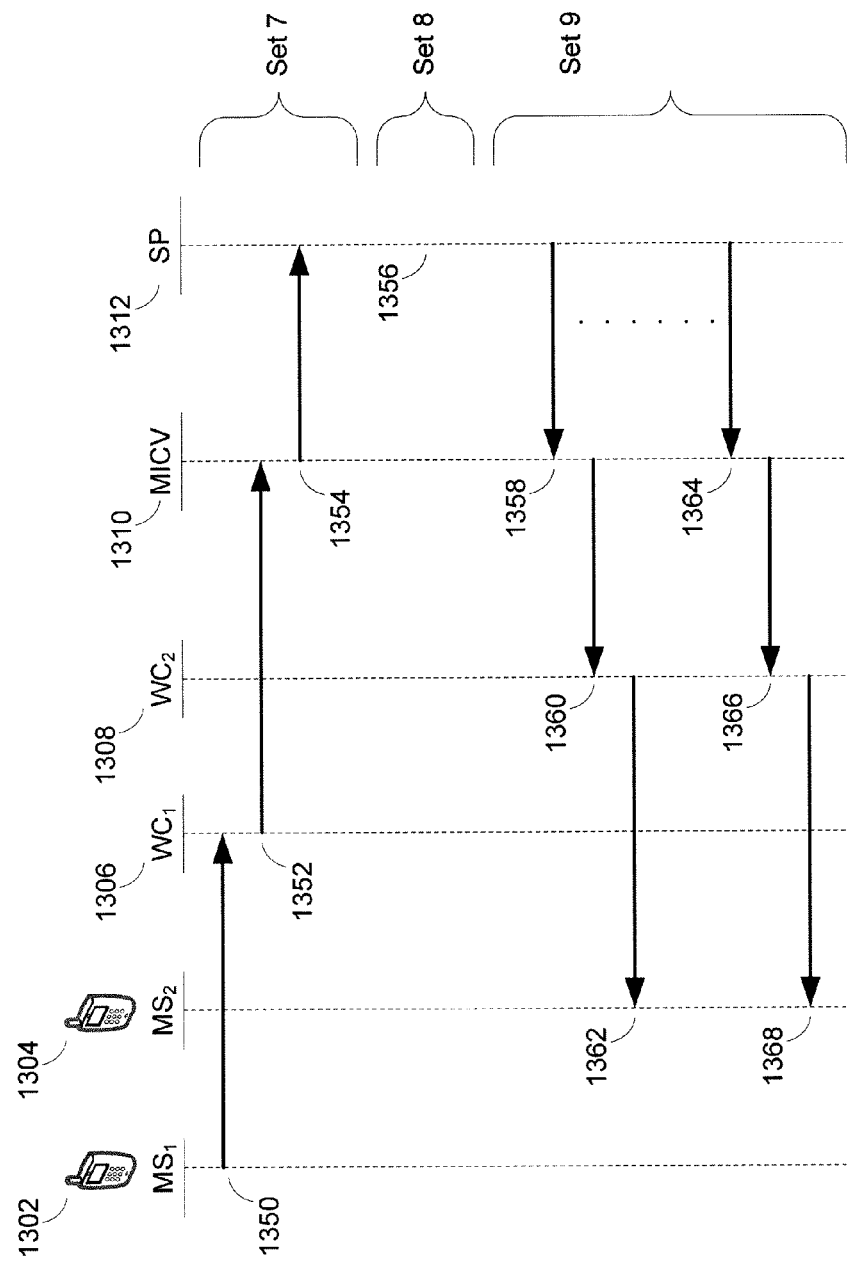

To help illustrate the operation of aspects of the present invention, FIGS. 13a, 13b, and 13c depict various of the exchanges that might take place during the delivery of an SMS message. As noted above:

1) While portions of the present discussion do, for simplicity of exposition, refer to messaging generally and certain types of messaging—including inter alia SMS, MMS, etc.—specifically, it will be readily apparent to one of ordinary skill in the relevant art that application of aspects of the present invention to numerous other communication paradigms (including inter alia a VoIP data stream, software application (e.g., game, etc.) data, a SIP-addressed artifact, a video data stream (e.g., a movie, a video conference call, etc.), a voice telephone call, an audio data stream (e.g., a song, etc.), signaling and other command-and-control data, etc.) is easily possible and indeed is fully within the scope of the present invention.

2) For variety, completeness etc. of exposition, the discussion below will include a MICV and a SP. It will be readily apparent to one of ordinary skill in the relevant art that numerous other arrangements are easily possible (e.g., any combination of one or more of inter alia a single MICV, multiple MICVs, a single SP, multiple SPs, etc.).

FIGS. 13a→13c include two MSs (MS$_1$ 1302 that is serviced by WC$_1$ 1306 and MS$_2$ 1304 that is serviced by WC$_2$ 1308), a MICV 1310, and a SP 1312.

For simplicity FIGS. 13a→13c capture various of the exchanges that might take place during the delivery of an SMS message from one MS (i.e., MS$_1$ 1302) to another MS (i.e., MS$_2$ 1304). It will be understood that a reply (by MS$_2$ 1304) to the received SMS message will encompass an equivalent set of exchanges (traveling from MS$_2$ 1304 to MS$_1$ 1302).

FIGS. 13a→13c help to visualize inter alia (1) various of the preparatory steps (e.g., the resolution of a message's destination address, obtaining different values (such as an IMSI value, a Mobile Switching Center (MSC) value, etc.) via a SendRoutingInfo inquiry and response) and (2) various of the conveyance steps (e.g., the actual delivery of the body or the content of a message via a ForwardShortMessage) that may take place during the delivery of a hypothetical SMS message and among other things highlights various of the benefits that arise from aspects of the present invention.

In FIG. 13a the exchanges that are captured under the designation Set 1 represent various of the activities that might take place as a MS, MS$_1$ 1302 of WC WC$_1$ 1306, dispatches an SMS message to another MS, MS$_2$ 1304 of WC WC$_2$ 1308.

As illustrated in the diagram, the message travels from MS$_1$ 1302 to WC$_1$ 1306 (see 1320) to a MICV 1310 (see 1322) and on to a SP 1312 (see 1324).

In FIG. 13a the exchanges that are captured under the designation Set 2 represent various of the (e.g., possibly WorkFlow-based) activities that might take place as SP 1312 completes inter alia a number of preparatory steps, processing activities, etc. including for example:

1) Resolving the destination address of the message (using for example aspects of an address resolution facility such as depicted in FIG. 11).

2) Constructing and dispatching a SendRoutingInfo inquiry (see 1326) comprising inter alia a Mobile Subscriber Integrated Services Digital Network Number (MSISDN). Such an inquiry may take any number of forms (including inter alia a MAP sendRoutingInfoForSM, etc.), may include any number of communication protocols (including inter alia an IP, national variants of SS7 such as an American National Standards Institute (ANSI) variant or an International Telecommunication Union (ITU) variant, SS7 variants or extensions such as SIGTRAN, etc.), and may be sent using for example any number of interfaces (including inter alia a TCP/IP interface such as reference numeral 1126 in FIG. 11, an SS7 interface reference such as reference numeral 1124 in FIG. 11, etc.). It will be readily apparent to one of ordinary skill in the relevant art that other communication interfaces, gateways (such as for example reference numerals 302 and 308 in FIG. 3), etc. are easily possible, any of which may leverage among other things protocol converters, software stacks, etc.

3) Receiving a SendRoutingInfo response (see 1328) comprising inter alia different values (such as for example an IMSI value, a MSC value, etc.). Such a response may take any number of forms (including inter alia a MAP sendRoutingInfoForSMResponse, etc.), may include any number of communication protocols (including inter alia an IP, national variants of SS7 such as an ANSI variant or an ITU variant, SS7 variants or extensions such as SIGTRAN, etc.), and may be received using for example any number of interfaces (including inter alia a TCP/IP interface such as reference numeral 1126 in FIG. 11, an SS7 interface reference such as reference numeral 1124 in FIG. 11, etc.). It will be readily apparent to one of ordinary skill in the relevant art that other communication interfaces, gateways (such as for example reference numerals 302 and 308 in FIG. 3), etc. are easily possible, any of which may leverage among other things protocol converters, software stacks, etc.

Among other things a SP may extract elements (such as for example an IMSI value, a MSC value, etc.) from a received SendRoutingInfo response (using for example a dynamic, configurable mapping mechanism), optionally complete any number of processing steps (to inter alia augment, transform, etc. any extracted elements), and inter alia preserve various pieces of information in a cache.

4) Possibly performing other lookup operations, processing steps (e.g., the creation, population, etc. of an IMO), data manipulation actions, etc.

In FIG. 13a the exchanges that are captured under the designation Set 3 represent various of the (e.g., possibly WorkFlow-based) activities that might take place as SP 1312 completes inter alia various conveyance steps including for example:

1) Possibly performing various processing steps (e.g., the leveraging of the contents of an IMO), data manipulation actions, etc.

2) Constructing and dispatching an SMS message. Such a message may take any number of forms (including inter alia a SMPP PDU, an SS7-based ForwardShortMessage, etc.), may include any number of pieces of information (including inter alia an IMSI value, a MSC value, etc.), may leverage any number of communication protocols (including inter alia an IP, national variants of SS7 such as an ANSI variant or an ITU variant, SS7 variants or extensions such as SIGTRAN, etc.), and may be sent using for example any number of interfaces (including inter alia a TCP/IP interface such as reference numeral 1126 in FIG. 11, an SS7 interface reference such as reference numeral 1124 in FIG. 11, etc.). It will be readily apparent to one of ordinary skill in the relevant art that other communication interfaces, gateways (such as for example reference numerals 302 and 308 in FIG. 3), etc. are easily possible, any of which may leverage among other things protocol converters, software stacks, etc.

The message travels from SP 1312 to a MICV (see 1330) and on to $WC_2$ 1308 (see 1332) for delivery to $MS_2$ 1304 (see 1334).

The Set 3 exchanges that were described above may be augmented in any number of ways to include various message delivery error recovery, retry, etc. capabilities.

As noted above, it will be understood that a reply (by $MS_2$ 1304) to the received SMS message will encompass an equivalent set of exchanges (traveling from $MS_2$ 1304 to $MS_1$ 1302.

In FIG. 13*b* the exchanges that are captured under the designation Set 4 represent various of the activities that might take place as $MS_1$ 1302 dispatches another SMS message to $MS_2$ 1304.

As illustrated in the diagram, the message travels from $MS_1$ 1302 to $WC_1$ 1306 (see 1336) to a MICV 1310 (see 1338) and on to a SP 1312 (see 1340).

In FIG. 13*b* the exchanges that are captured under the designation Set 5 represent various of the (e.g., possibly WorkFlow-based) activities that might take place as SP 1312 completes inter alia a number of preparatory steps, processing activities, etc. (see 1342) including for example:

1) Resolving the destination address of the message (using for example aspects of an address resolution facility such as depicted in FIG. 11).

2) Retrieving one or more pieces of information (such as inter alia an IMSI value, a MSC value, etc.) from a cache. (Note that this operation obviates the need for inter alia the SendRoutingInfo inquiry (see 1326 in FIG. 13*a*) and response (see 1328 in FIG. 13*a*) that were discussed above.)

3) Possibly performing other lookup operations, processing steps (e.g., the creation, population, etc. of an IMO), data manipulation actions, etc.

In FIG. 13*b* the exchanges that are captured under the designation Set 6 represent various of the (e.g., possibly WorkFlow-based) activities that might take place as SP 1312 completes inter alia various conveyance steps including for example:

1) Possibly performing various processing steps (e.g., the leveraging of the contents of an IMO), data manipulation actions, etc.

2) Constructing and dispatching an SMS message. Such a message may take any number of forms (including inter alia a SMPP PDU, an SS7-based ForwardShortMessage, etc.), may include any number of pieces of information (including inter alia an IMSI value, a MSC value, etc.), may leverage any number of communication protocols (including inter alia an IP, national variants of SS7 such as an ANSI variant or an ITU variant, SS7 variants or extensions such as SIGTRAN, etc.), and may be sent using for example any number of interfaces (including inter alia a TCP/IP interface such as reference numeral 1126 in FIG. 11, an SS7 interface reference such as reference numeral 1124 in FIG. 11, etc.). It will be readily apparent to one of ordinary skill in the relevant art that other communication interfaces, gateways (such as for example reference numerals 302 and 308 in FIG. 3), etc. are easily possible, any of which may leverage among other things protocol converters, software stacks, etc.

The message travels from SP 1312 to a MICV (see 1344) and on to $WC_2$ 1308 (see 1346) for delivery to $MS_2$ 1304 (see 1348).

The Set 6 exchanges that were described above may be augmented in any number of ways to include various message delivery error recovery, retry, etc. capabilities. For example, if an issued ForwardShortMessage is rejected then inter alia various of the FIG. 13*a* Set 2 activities may be invoked (e.g., a SendRoutingInfo inquiry and response followed by a cache update) and a new ForwardShortMessage may be issued.

As noted above, it will be understood that a reply (by $MS_2$ 1304) to the received SMS message will encompass an equivalent set of exchanges (traveling from $MS_2$ 1304 to $MS_1$ 1302.

In FIG. 13*c* the exchanges that are captured under the designation Set 7 represent various of the activities that might take place as $MS_1$ 1302 dispatches yet another SMS message to $MS_2$ 1304.

As illustrated in the diagram, the message travels from $MS_1$ 1302 to $WC_1$ 1306 (see 1350) to a MICV 1310 (see 1352) and on to a SP 1312 (see 1354).

In FIG. 13*c* the exchanges that are captured under the designation Set 8 represent various of the (e.g., possibly WorkFlow-based) activities that might take place as SP 1312 completes inter alia a number of preparatory steps, processing activities, etc. (see 1356) including for example:

1) Resolving the destination address of the message (using for example aspects of an address resolution facility such as depicted in FIG. 11).

2) Retrieving one or more pieces of information (such as inter alia an IMSI value, a MSC value, etc.) from a cache. (As noted above in connection with FIG. 13*b*, this operation obviates the need for inter alia the SendRoutingInfo inquiry (see 1326 in FIG. 13*a*) and response (see 1328 in FIG. 13*a*).)

3) Possibly performing other lookup operations, processing steps (e.g., the creation, population, etc. of an IMO), data manipulation actions, etc.

In FIG. 13*c* the exchanges that are captured under the designation Set 9 represent various of the (e.g., possibly WorkFlow-based) activities that might take place as SP 1312 completes inter alia various conveyance steps including for example:

1) Possibly performing various processing steps (e.g., the leveraging of the contents of an IMO), data manipulation actions, etc.

2) Constructing and dispatching multiple SMS messages (necessitated by for example message body or content segmentation, etc.). Each message may take any number of forms (including inter alia a SMPP PDU, an SS7-based ForwardShortMessage, etc.), may include any number of pieces of information (including inter alia an IMSI value, a MSC value, etc.), may leverage any number of communication protocols (including inter alia an IP, national variants of SS7 such as an ANSI variant or an ITU variant, SS7 variants or extensions such as SIGTRAN, etc.), and may be sent using for example any number of interfaces (including inter alia a TCP/IP interface such as reference numeral 1126 in FIG. 11, an SS7 interface reference such as reference numeral 1124 in FIG. 11, etc.). It will be readily apparent to one of ordinary skill in the relevant art that other communication interfaces, gateways (such as for example reference numerals 302 and 308 in FIG. 3), etc. are easily possible, any of which may leverage among other things protocol converters, software stacks, etc.

Each message travels from SP 1312 to a MICV (see 1358 and 1364) and on to $WC_2$ 1308 (see 1360 and 1366) for delivery to $MS_2$ 1304 (see 1362 and 1368).

The Set 9 exchanges that were described above may be augmented in any number of ways to include various message delivery error recovery, retry, etc. capabilities. For example, if an issued ForwardShortMessage is rejected then inter alia various of the FIG. 13*a* Set 2 activities may be invoked (e.g., a SendRoutingInfo inquiry and response followed by a cache update) and a new ForwardShortMessage may be issued.

As noted above, it will be understood that a reply (by MS$_2$ 1304) to any of the received SMS messages will encompass an equivalent set of exchanges (traveling from MS$_2$ 1304 to MS$_1$ 1302.

The Set 1→Set 9 exchanges that were described above are illustrative only and it will be readily apparent to one of ordinary skill in the relevant art that numerous other exchanges, exchange sequences, activities, etc. are easily possible and indeed are fully within the scope of the present invention. For example and inter alia:

1) Various of the depicted exchanges may be repeated any number of times as possibly inter alia the MSs (i.e., MS$_1$ 1302 and MS$_2$ 1304) carry on for example a message-based conversation.

2) A cache as described above may be implemented through any number of means including inter alia memory (e.g., raw and/or structured), disk or other storage medium (e.g., raw and/or structured), etc. and may leverage among other things conventional Relational Database Management Systems (RDBMSs), Object Database Management Systems (ODBMSs), in-memory Database Management Systems (DBMSs), or any other equivalent facilities. Caches 1450 are shown diagrammatically in FIG. 14. A single instance of a cache 1450 may be implemented or two or more instances, as depicted, may be deployed. One instance could be used as a backup of another instance. As shown, cache 1450 may be integrated with a main memory 1406 and/or with a secondary memory 1410, which are described more fully in connection with FIG. 14.

3) Access to a cache as described above may encompass an Application Programming Interface (API), direct memory read and write operations, wrapper functions, etc. any of which may employ inter alia security, control, etc. mechanisms.

4) Retrieval of information from a cache as describe above may encompass any combination of one or more of iteration through the contents of the cache, hash functions, algorithmic search capabilities, etc.

5) An entry in a cache as described above may contain a range of values including inter alia identifying values (such as for example a MSISDN, an IMSI value, a MSC value, etc.), timestamps, location information (such as for example information on the current physical location of a MS' WD, an indicator (e.g., extracted, derived, etc. from a response received during a preparatory step) as to whether the MS' WD is on its home network or if it is roaming, etc.), counters (e.g., tracking access to, or usage of, an entry), etc.

6) Management of a cache as described above may encompass among other things garbage collection (e.g., periodic 'sweeps' through the contents of the cache to recover entries, space, etc.), aging of the contents of the cache (e.g., removing, refreshing, altering, etc. various entries of the cache based on different criteria (such as for example date, time, usage frequency, etc.), periodic integrity checks, etc. Among other things, if a cache entry identifies a MS' WD as roaming then that cache entry's management particulars (including inter alia expiration time, refresh rate, etc.) may be appropriately modified.

7) A cache as described above may be initially, periodically, etc. 'seeded' with certain (predefined, dynamically constructed, etc.) real, sentinel, etc. entries.

During various of the processing steps that were described above one or more billing transactions may optionally be completed—e.g., for various of the processing steps that are performed, for each response returned, etc. A billing transaction may take any number of forms and may involve different external entities (e.g., a WC's billing system, a carrier billing system service bureau, a credit or debit card clearinghouse, etc.). A billing transaction may include, possibly inter alia:

1) The appearance of a line item charge on the bill or statement that, for example, an entity may receive from their WC. Exemplary mechanics and logistics associated with this approach are described in for example U.S. Pat. No. 7,640,211 entitled "SYSTEM AND METHOD FOR BILLING AUGMENTATION" and its associated continuations. Other ways of completing or performing line item billing are easily implemented by those skilled in the art.

2) The charging of a credit card or the debiting of a debit card.

3) The charging of an internal account.

4) The generation of aspects of an invoice.

Various of the messages that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Location-Based Service (LBS) facility).

Various of the messages that were described above may optionally contain advertising—e.g., textual material if a simple paradigm (such as SMS) is being utilized, or multimedia (images of brand logos, sound, video snippets, etc.) material if a more capable paradigm (such as MMS) is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

Various of the messages that were described above may optionally contain promotional materials (e.g., still images, video clips, etc.).

The discussion that was presented above included TNs. However, it is to be understood that it would be readily apparent to one of ordinary skill in the relevant art that numerous other addresses or identifiers (such as possibly inter alia SCs, IP addresses, E-Mail addresses, IM handles, SIP addresses, etc.) are easily possible and indeed are fully within the scope of the present invention.

The discussion that was presented above referenced messaging generally and two specific messaging paradigms—SMS and MMS—specifically. However, as was noted previously, it will be readily apparent to one of ordinary skill in the relevant art that application of aspects of the present invention to numerous other communication paradigms (including inter alia a VoIP data stream, software application (e.g., game, etc.) data, a SIP-addressed artifact, a video data stream (e.g., a movie, a video conference call, etc.), a voice telephone call, an audio data stream (e.g., a song, etc.), signaling and other command-and-control data, etc.) is easily possible and indeed is fully within the scope of the present invention.

For purposes of illustration aspects of the discussion that was presented above employed a specific vehicle (consisting of a SendRoutingInfo inquiry and a SendRoutingInfo response) but it will be readily apparent to one of ordinary skill in the relevant art that aspects of the present invention are easily generalized to any data delivery paradigm that employs inter alia (1) one or more preparatory steps and (2) a one or more conveyance steps.

Figure 14:
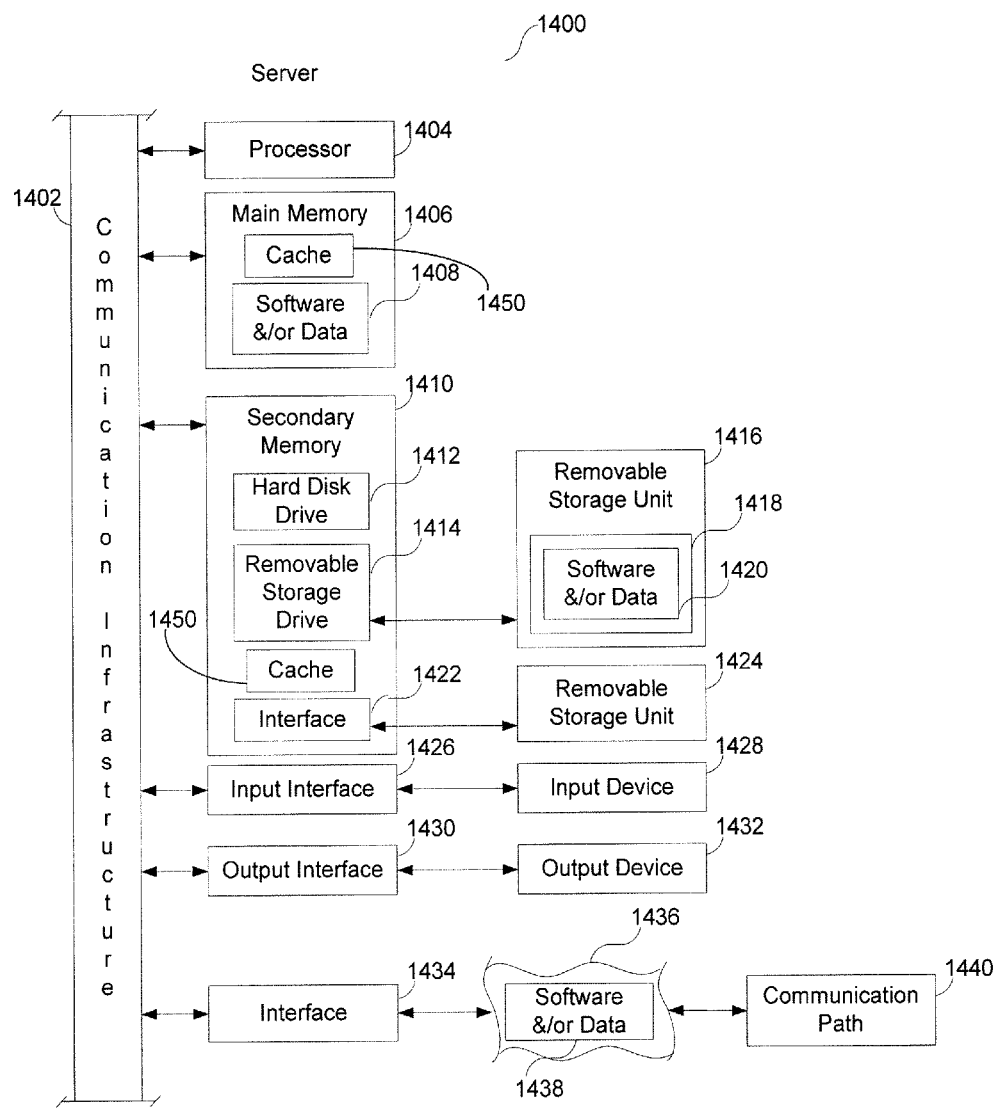
FIG. 14 depicts an exemplary computer system through which embodiments of aspects of the present invention may be implemented.

Various aspects of the present invention can be implemented by software, firmware, hardware, or any combination thereof. FIG. 14 illustrates an example computer system 1400 in which the present invention, or portions thereof, (such as described above under paragraphs 00031-00139) can be implemented as computer-readable code. Various embodiments of the invention are described in terms of this example computer system 1400. After reading this description, it will become apparent to a person skilled in the relevant art how to implement the invention using other computer systems and/or computer architectures. Computer system 1400 may be a server or other electronic device or appliance configured to operate in accordance with the functionality described herein.

Computer system 1400 includes one or more processors, such as processor 1404. Processor 1404 can be a special purpose processor or a general purpose processor. Processor 1404 is connected to a communication infrastructure 1402 (for example, a bus or a network).

Computer system 1400 also includes a main memory 1406, preferably Random Access Memory (RAM), containing possibly inter alia computer software and/or data 1408.

Computer system 1400 may also include a secondary memory 1410. Secondary memory 1410 may include, for example, a hard disk drive 1412, a removable storage drive 1414, a memory stick, etc. A removable storage drive 1414 may comprise a floppy disk drive, a magnetic tape drive, an optical disk drive, a flash memory, or the like. A removable storage drive 1414 reads from and/or writes to a removable storage unit 1416 in a well known manner. A removable storage unit 1416 may comprise a floppy disk, magnetic tape, optical disk, etc. which is read by and written to by removable storage drive 1414. As will be appreciated by persons skilled in the relevant art(s) removable storage unit 1416 includes a computer usable storage medium 1418 having stored therein possibly inter alia computer software and/or data 1420.

In alternative implementations, secondary memory 1410 may include other similar means for allowing computer programs or other instructions to be loaded into computer system 1400. Such means may include, for example, a removable storage unit 1424 and an interface 1422. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 1424 and interfaces 1422 which allow software and data to be transferred from the removable storage unit 1424 to computer system 1400.

Computer system 1400 may also include an input interface 1426 and a range of input devices 1428 such as, possibly inter alia, a keyboard, a mouse, etc.

Computer system 1400 may also include an output interface 1430 and a range of output devices 1432 such as, possibly inter alia, a display, one or more speakers, etc.

Computer system 1400 may also include a communications interface 1434. Communications interface 1434 allows software and/or data 1438 to be transferred between computer system 1400 and external devices. Communications interface 1434 may include a modem, a network interface (such as an Ethernet card), a communications port, a Personal Computer Memory Card International Association (PCM-CIA) slot and card, or the like. Software and/or data 1438 transferred via communications interface 1434 are in the form of signals 1436 which may be electronic, electromagnetic, optical, or other signals capable of being received by communications interface 1434. These signals 1436 are provided to communications interface 1434 via a communications path 1440. Communications path 1440 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 1416, removable storage unit 1424, and a hard disk installed in hard disk drive 1412. Signals carried over communications path 1440 can also embody the logic described herein. Computer program medium and computer usable medium can also refer to memories, such as main memory 1406 and secondary memory 1410, which can be memory semiconductors (e.g. Dynamic Random Access Memory (DRAM) elements, etc.). These computer program products are means for providing software to computer system 1400.

Computer programs (also called computer control logic) are stored in main memory 1406 and/or secondary memory 1410. Computer programs may also be received via communications interface 1434. Such computer programs, when executed, enable computer system 1400 to implement the present invention as discussed herein. In particular, the computer programs, when executed, enable processor 1404 to implement the processes of aspects of the present invention, such as the steps discussed above under paragraphs 00031-00139. Accordingly, such computer programs represent controllers of the computer system 1400. Where the invention is implemented using software, the software may be stored in a computer program product and loaded into computer system 1400 using removable storage drive 1414, interface 1422, hard drive 1412 or communications interface 1434.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

It is important to note that the hypothetical examples that were presented above, which were described in the narrative and which were illustrated in the accompanying figures, are exemplary only. They are not intended to be exhaustive or to limit the invention to the specific forms disclosed. It will be readily apparent to one of ordinary skill in the relevant art that numerous alternatives to the presented examples are easily possible and, indeed, are fully within the scope of the present invention.

The following list defines acronyms as used in this disclosure.

| Acronym | Meaning |
| --- | --- |
| A2P | Application-to-Peer |
| ANSI | American National Standards Institute |
| API | Application Programming Interface |
| CD-ROM | Compact Disc Read-Only Memory |
| CP | Content Provider |
| CRD | Composite Routing Database |
| DBMS | Database Management System |
| DH | Data Highway |
| DPE | Data Processing Engine |
| DRAM | Dynamic Random Access Memory |
| E-Mail | Electronic Mail |
| ENUM | Electronic Numbering |
| EPROM | Erasable Programmable Read-Only Memory |
| GPRS | General Packet Radio Service |
| GRX | GPRS Roaming Exchange |
| IM | Instant Messaging |
| IMO | Internal Message Object |
| IMS | IP Multimedia Subsystem |
| IMSI | International Mobile Subscriber Identity |
| IP | Internet Protocol |
| ITU | International Telecommunication Union |
| JMS | Java Message Service |
| LBS | Location-Based Service |
| LERG | Local Exchange Routing Guide |
| MAP | Mobile Application Part |
| MEMS | Microelectromechanical Systems |
| MICV | Messaging Inter-Carrier Vendor |
| MMS | Multimedia Message Service |
| MMSC | Multimedia Message Service Center |
| MNP | Mobile Number Portability |
| MS | Mobile Subscriber |
| MSC | Mobile Switching Center |
| MSISDN | Mobile Subscriber Integrated Services Digital Network Number |
| MSU | Message Signal Unit |
| NPAC | Number Portability Administration Center |
| ODBMS | Object Database Management System |
| P2P | Peer-to-Peer |
| PCMCIA | Personal Computer Memory Card International Association |
| PDU | Protocol Data Unit |
| PROM | Programmable Read-Only Memory |
| RAM | Random Access Memory |
| RDBMS | Relational Database Management System |
| RF | Radio Frequency |
| RTQF | Real-Time Query Facility |
| SC | Short Code |
| SIP | Session Initiation Protocol |
| SMPP | Short Message Peer-to-Peer |
| SMS | Short Message Service |
| SMSC` | Short Message Service Center |
| SP | Service Provider |
| SS7 | Signaling System Number 7 |
| 3P | Third Party |
| TCP | Transmission Control Protocol |
| TN | Telephone Number |
| UDP | User Datagram Protocol |
| URI | Uniform Resource Identifier |
| URL | Uniform Resource Locator |
| VoIP | Voice Over IP |
| WAP | Wireless Application Protocol |
| WC | Wireless Carrier |
| WD | Wireless Device |

What is claimed is:

1. A method, performed on a server computing device, for directing a quanta of data, the method comprising:
   receiving the quanta of data at a gateway, the quanta of data comprising an originating address, a destination address, and content;
   performing a plurality of processing steps including at least:
   (a) creating an Internal Message Object (IMO) from at least aspects of the quanta of data,
   (b) characterizing aspects of the quanta of data including at least by a type,
   (c) resolving the destination address, and
   (d) obviating the need to complete a preparatory step, involving a query external to the server and associated with conveying aspects of the IMO to a given destination derived from the resolving step, by retrieving at least an identifying value from an entry in a cache; and
   utilizing the identifying value to convey selected aspects of the IMO to the given destination,
   wherein the entry in the cache is populated with aspects of a SendRoutingInfo response.

2. The method of claim 1, wherein the quanta of data is one of a Short Message Service message, a Multimedia Message Service message, an IP Multimedia Subsystem message, video data, signaling data, or application data.

3. The method of claim 1, wherein the entry in the cache is at least one of removed and refreshed, based on an aging process.

4. The method of claim 1, wherein the identifying value comprises one or more of an International Mobile Subscriber Identity (IMSI) value and a Mobile Switching Center (MSC) value.

5. The method of claim 1, wherein the selected aspects of the IMO are conveyed as of one of a Short Message Service message, a Multimedia Message Service message, an IP Multimedia Subsystem message, video data, signaling data, or application data.

6. A system configured to direct a quanta of data, the system comprising:
   a first gateway configured to receive the quanta of data, the quanta of data comprising an originating address, a destination address, and content;
   workflow modules configured to perform a plurality of processing steps including at least:
   (a) creating an Internal Message Object (IMO) from at least aspects of the quanta of data,
   (b) characterizing aspects of the quanta of data including at least by a type,
   (c) resolving the destination address, and
   (d) obviating the need to complete a preparatory step, involving a query external to the system and associated with conveying aspects of the IMO to a given destination derived from the resolving step, by retrieving an identifying value from an entry in a cache; and
   a second gateway configured to utilize the identifying value to convey selected aspects of the IMO to the given destination address,
   wherein the entry in the cache is populated with aspects of a SendRoutingInfo response.

7. The system of claim 6, wherein the quanta of data is one of a Short Message Service message, a Multimedia Message Service message, an IP Multimedia Subsystem message, video data, signaling data, or application data.

8. The system of claim 6, wherein the entry in the cache is at least one of removed and refreshed, based on an aging process.

9. The system of claim 6, wherein the identifying value comprises one or more of an International Mobile Subscriber Identity (IMSI) value and a Mobile Switching Center (MSC) value.

10. The system of claim 6, wherein the selected aspects of the IMO are conveyed via the second gateway as one of a Short Message Service message, a Multimedia Message Service message, an IP Multimedia Subsystem message, video data, signaling data, or application data.

11. A non-transitory processor readable medium encoded with instructions that, when executed by a processor, cause the processor to:

receive a quanta of data at a gateway, the quanta of data comprising an originating address, a destination address, and content;

perform a plurality of processing steps including at least:

(a) creating an Internal Message Object (IMO) from at least aspects of the quanta of data, (b) characterizing aspects of the quanta of data including at least by a type, (c) resolving the destination address, and (d) obviating the need to complete a preparatory step, involving a query external to the server and associated with conveying aspects of the IMO to a given destination derived from the resolving step, by retrieving at least an identifying value from an entry in a cache;

utilize the identifying value to convey selected aspects of the IMO to the given destination; and populate the entry in the cache with aspects of a SendRoutingInfo response.

12. The non-transitory processor readable medium of claim 11, wherein the entry in the cache is at least one of removed and refreshed, based on an aging process.

13. A method, performed on a server computing device, for directing a quanta of data, the method comprising:

receiving the quanta of data at a gateway, the quanta of data comprising an originating address, a destination address, and content;

performing a plurality of processing steps including at least:

(a) creating an Internal Message Object (IMO) from at least aspects of the quanta of data, (b) characterizing aspects of the quanta of data including at least by a type, (c) resolving the destination address, and (d) obviating the need to complete a preparatory step, involving a query external to the server and associated with conveying aspects of the IMO to a given destination derived from the resolving step, by retrieving at least an identifying value from a cache; and utilizing the identifying value to convey selected aspects of the IMO to the given destination, wherein the identifying value comprises one or more of an International Mobile Subscriber Identity (IMSI) value and a Mobile Switching Center (MSC) value.

14. A system configured to direct a quanta of data, the system comprising:

a first gateway configured to receive the quanta of data, the quanta of data comprising an originating address, a destination address, and content;

workflow modules configured to perform a plurality of processing steps including at least:

(a) creating an Internal Message Object (IMO) from at least aspects of the quanta of data, (b) characterizing aspects of the quanta of data including at least by a type, (c) resolving the destination address, and (d) obviating the need to complete a preparatory step, involving a query external to the system and associated with conveying aspects of the IMO to a given destination derived from the resolving step, by retrieving an identifying value from a cache; and a second gateway configured to utilize the identifying value to convey selected aspects of the IMO to the given destination address, wherein the identifying value comprises one or more of an International Mobile Subscriber Identity (IMSI) value and a Mobile Switching Center (MSC) value.

* * * * *